(12) United States Patent
Henneberry et al.

(10) Patent No.: US 7,415,725 B2
(45) Date of Patent: Aug. 19, 2008

(54) MULTI-FUNCTION INTELLIGENT ELECTRONIC DEVICE WITH SECURE ACCESS

(75) Inventors: Scott M. Henneberry, Franklin, TN (US); Rene T. Jonker, Victoria (CA); Martin A. Hancock, Victoria (CA); I. Ross Macfarlane, Victoria (CA); Aaron J Taylor, Brentwood Bay (CA); Doug S. Ransom, Victoria (CA); Geoffrey T. Hyatt, Victoria (CA)

(73) Assignee: Power Measurement Ltd., Saanichton, BC (CA)

( * ) Notice: Subject to any disclaimer, the term of this patent is extended or adjusted under 35 U.S.C. 154(b) by 973 days.

(21) Appl. No.: 10/647,560

(22) Filed: Aug. 25, 2003

(65) Prior Publication Data

US 2007/0055889 A1   Mar. 8, 2007

Related U.S. Application Data

(60) Provisional application No. 60/459,152, filed on Mar. 31, 2003, provisional application No. 60/459,182, filed on Mar. 31, 2003, provisional application No. 60/406,854, filed on Aug. 29, 2002.

(51) Int. Cl.
G06F 7/04 (2006.01)
(52) U.S. Cl. .................. 726/17; 700/286; 700/295; 702/62
(58) Field of Classification Search .......... 726/17, 726/9, 19, 20, 21; 702/62; 700/295, 286
See application file for complete search history.

(56) References Cited

U.S. PATENT DOCUMENTS

| | | | |
|---|---|---|---|
| 4,804,957 A | 2/1989 | Selph et al. | 340/870.03 |
| 5,650,936 A * | 7/1997 | Loucks et al. | 702/62 |
| 6,000,034 A * | 12/1999 | Lightbody et al. | 726/21 |
| 6,157,721 A | 12/2000 | Shear et al. | 380/255 |
| 6,351,817 B1 * | 2/2002 | Flyntz | 726/4 |
| 6,512,463 B1 | 1/2003 | Campbell et al. | |
| 7,069,161 B2 * | 6/2006 | Gristina et al. | 702/61 |

OTHER PUBLICATIONS

"8400 ION, 8500 ION Advanced Socket-Mount Meter", 8400 ION.TM 8500 ION.TM, Power Measurement, Datasheet (Nov. 30, 2000).
"ION System Security", Power Measurement, Technical Note (Dec. 15, 2003).

* cited by examiner

Primary Examiner—Ellen Tran
(74) Attorney, Agent, or Firm—Brinks Hofer Gilson & Lione

(57) ABSTRACT

An intelligent electronic device with multiple functionalities that may include multiple secure accesses includes a sensor coupled with a processor. The sensor may sense electrical parameters in an electrical circuit and generate signals indicative of the electrical parameters for the processor. The processor may be configured to concurrently operate multiple intelligent electronic device functionalities. The intelligent electronic device functionalities may each include one or more functions. The functions within one of the intelligent electronic device functionalities may be mutually exclusive. Secure access to one or more of the intelligent electronic device functionalities may be enabled by entry of a user identification.

45 Claims, 8 Drawing Sheets

MULTI-FUNCTION INTELLIGENT ELECTRONIC DEVICE WITH SECURE ACCESS

RELATED APPLICATIONS

The present patent document claims the benefit of the filing dates under 35 U.S.C. §119(e) of Provisional U.S. Patent Application Ser. No. 60/406,854, filed Aug. 29, 2002, Provisional U.S. Patent Application Ser. No. 60/459,182 filed Mar. 31, 2003 and Provisional U.S. Patent Application Ser. No. 60/459,152, filed Mar. 31, 2003, each of which is hereby incorporated by reference.

BACKGROUND

The present invention relates to the control and monitoring of power systems. More specifically the present invention relates to secure access to a current sensing intelligent electronic device capable of performing multiple power system related functions.

Presently power systems are often controlled and protected by individual protective relays. Each relay generally protects a portion of the power system generally referred to as a zone. The settings of the protective relays are fixed after being configured during the commissioning of the power system. The settings may be input into the protective relays manually through the front panel of the protective relay or via a communications link in which case the person commissioning the system inputs the settings via a terminal or other similar interface. Once the protective relays are setup, the settings are generally not changed or if they are changed, the new settings are once again manually input.

Protective relays sometimes have an output trip signal indication that can be provided to an upstream relay to indicate that a fault has been sensed. The upstream relay may implement a hold off delay before tripping an associated breaker when this signal is received. This signal can be a dedicated digital signal or may be implemented in a communications protocol, but is generally limited to indicating an impending trip of a downstream breaker.

Protective relays often implement some power metering or monitoring functions. Such functions include the monitoring of voltage, current, power, frequency, power factor, energy, etc. Due to the fact that the protective relay may have a wide amplitude range and a narrow frequency response, the measurement accuracy is generally not as high as power meters dedicated to metering and/or monitoring.

Protective relays are generally unable to perform most power quality functions due to their limited measurement bandwidth. Power quality functions include the measurement of the harmonics of the power system frequency present in the voltage and current, power harmonics, symmetrical components, detection of sags, transients and surges, waveform captures, etc.

A consultant study is typically only done once every 10 to 15 years for a power distribution system. At the time of the consultant study, the appropriate settings for each protective relay and other related devices are determined. As the power distribution system changes and/or loads are added or changed, it typically becomes difficult to correlate the information from the last consultant study with the actual operational information of the system during use.

SUMMARY

The present invention is defined by the following claims, and nothing in this section should be taken as a limitation on those claims. By way of introduction, the preferred embodiments described below relate to an intelligent electronic device (IED) for monitoring electrical parameters such as current in an electrical circuit of a power system. The IED may include a processor configured to concurrently provide the capability of protective relays, intelligent meters, power quality instruments and breaker control within a single IED. The capabilities of the IED may be separated into IED functionalities that include a protective relay functionality, a billing power monitoring functionality, a power quality functionality, a breaker control functionality, a logic based decision functionality, a sequence of event recording functionality and/or a data capture functionality. The various IED functionalities within the IED may be operated in parallel by the processor and share an interface of the IED.

A plurality of functions may be included within each of the IED functionalities. The functions may include data parameters such as a kilowatt hour reading, a relay setting, an alarm setting, a calculation constant, etc. The functions may be included in one or more of the IED functionalities. When a function is only included in select IED functionalities, the function is a mutually exclusive function.

Each of the IED functionalities may also include a security access. The security access may allow access to an associated IED functionality upon entry of a user identification (ID). Accordingly, various users or groups of users may be provided with different user IDs to provide access to different IED functionalities within an IED that include mutually exclusive functions. The IED therefore provides an authorized user secure access to one or more IED functionalities without exposing other IED functionalities to access by that user.

The user IDs may include a security code, a permissive signal and indication of which IED functionalities are enabled for secure access. A user ID may be related to a security token. The security code may be provided by a biometric identification device such as a fingerprint scanner, a face recognition unit, etc. The permissive signal may provide secure access to the IED functionality(s) enabled by the user ID only when a predetermined condition is met such as enablement of a safety lockout mechanism, status of a digital input, etc.

A user ID may be provided to the IED as a security signal. The IED may prompt a user for entry of a first user ID when the user requests access to a first IED functionality. The user may provide the first user ID in the form of the security signal to the IED via the interface of the IED. The interface may include the capability to remotely provide a user ID and access the IED functionality over a communication medium. In addition, local access to provide a user ID and access the IED functionality may be included in the interface. The security access of the first IED functionality may enable access to the first IED functionality. When the user requests access to a second IED functionality not enabled by the first user ID, the IED may again prompt the user for a second user ID that enables access to the second IED functionality.

Further aspects and advantages of the invention are discussed below in conjunction with the preferred embodiments.

DETAILED DESCRIPTION OF THE PRESENTLY PREFERRED EMBODIMENTS

Herein, the phrase "coupled with" is defined to mean directly connected to or indirectly connected through one or more intermediate components. Such intermediate components may include both hardware and software based components.

Figure 1:
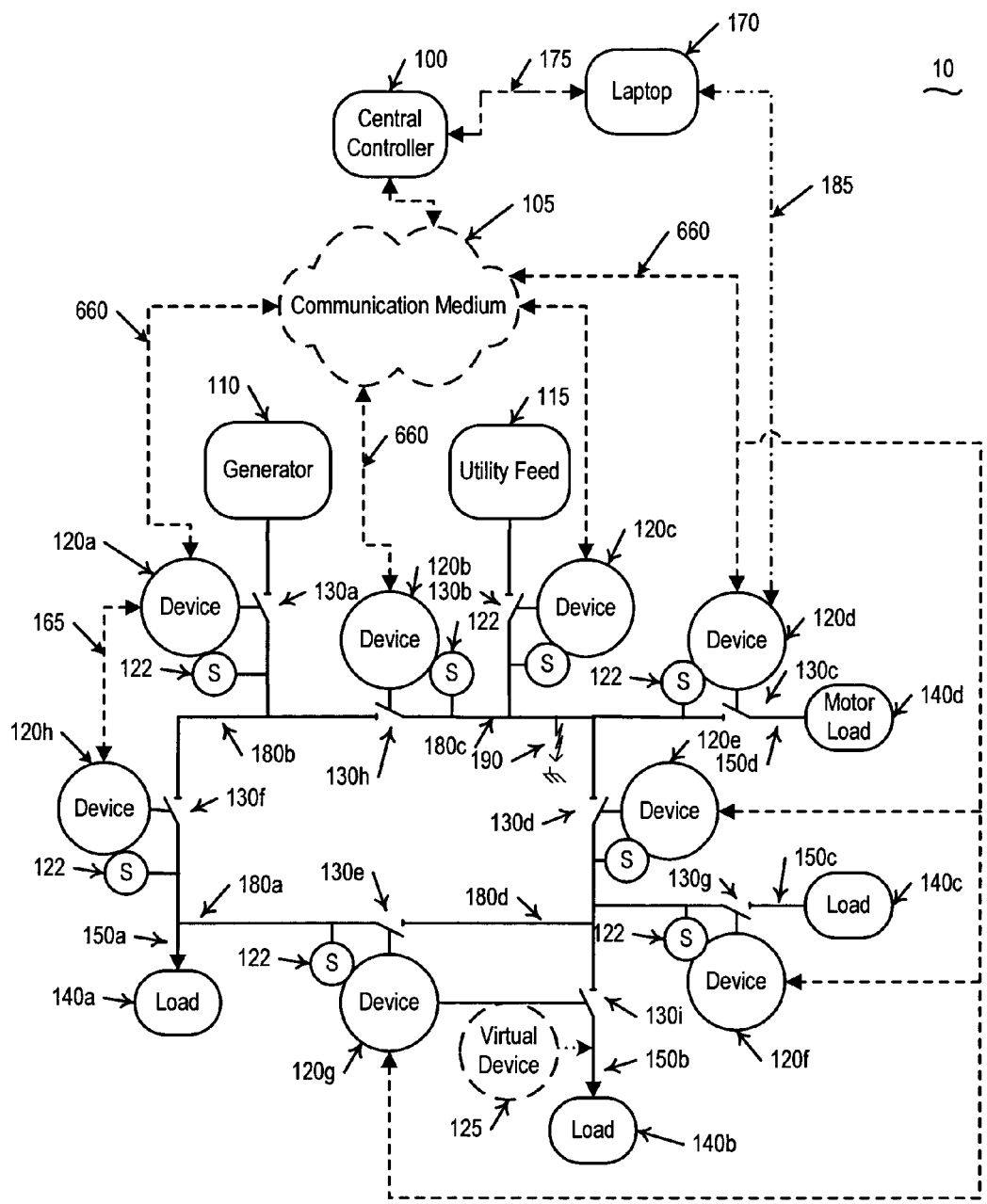
FIG. 1 schematically illustrates an exemplary power system incorporating the devices and system of the present invention.

In FIG. 1, an enterprise energy management system 10 is shown within a power system of an enterprise. The distribution of electricity to various loads 140a, 140b, 140c, 140d through various feeders 150a, 150b, 150c, 150d, respectively, from two sources (generator 110 and utility feed 115) is shown. The illustrated power system includes a plurality of breakers 130 interconnected by busses 180 and feeders 150 with the loads 140, the generator 110 and the utility feed 115. Distribution of electricity may be controlled and monitored with the enterprise energy management system 10 by several intelligent electronic devices (IEDs) 120a, 120b, 120c, 120d, 120f, 120g, 120h associated with the breakers 130 as illustrated.

The IEDs 120 can provide the paralleled capability of standalone protective relays, standalone intelligent meters, standalone power quality instruments and standalone breaker control. The IEDs 120 may be logic-based electronic computing devices that concurrently provide a protective relay functionality, a power monitoring functionality, a power quality functionality that includes a sequence of events recording, and a circuit breaker control function in a single device. IEDs 120 can be coupled to electric power lines, such as the busses 180 and feeders 150, and monitor at least one electrical parameter within these electric power lines. Electrical parameters include, but are not limited to rms voltage, rms current, kilowatts (kW), kilo volts-amps reactive (kVAR), kilo volts-amps (kVA), harmonics, power factor, etc. Electrical parameters may be referred to as energy parameters or power parameters.

Each of the IEDs 120 may include one or more sensors 122 to detect and monitor electrical parameters of the electric power lines. The sensors 122 may include current sensors and voltage sensors. The sensors 122 may be mounted externally to the IEDs 120, and/or internally within the IEDs 120.

Sensors 122 that are current sensors may be, for example, a current transformer (CT) or other similar device capable of measuring current flowing in one or more phases of the electric power lines. Well known types of current sensors include a wound type, a bar type, a bushing type, a window type, a clamp-on type, an optical type, a Rogoski coil type or a Hall effect type. Current sensors typically include a primary winding for measuring the primary current flowing in the electric power lines, and a secondary winding for outputting a secondary current in direct proportion, and at a relationship, to the primary current. The secondary current may be received by the IEDs 120.

Sensors 122 that are voltage sensors may be any device capable of measuring the voltage present on the electrical power lines. One example of a voltage sensor is a potential transformer (PT) that may be, for example, a multiple winding step-up or step-down transformer. Alternatively, a voltage sensor may be an optical voltage transformer (Optical VT) sensor. Voltage sensors may be single-phase devices connected in parallel with one phase of the electric power lines. The primary voltage on the electric power lines may be measured by a primary winding of the voltage sensor. A secondary voltage representing a stepped down version of the primary voltage may be an output from a secondary winding of the voltage sensor. During operation, voltage present on the electric power lines may be transformed by the voltage sensor to an electrical signal compatible with the IEDs 120. The secondary voltage may be, for example, a voltage in a range around 120 VAC. Alternatively, where the magnitude of the voltage of the electric power lines is compatible, sensors 122 for sensing voltage may be omitted and the IEDs 120 may be coupled directly with the electric power lines.

The IEDs 120 contain hardware and software that allows each IED 120 to provide the high accuracy of a billing power/energy meter. In addition, each of the IEDs 120 may provide the wide dynamic current input range and rapid response time of a protective relay as well as, the wide dynamic input range, sensitivity and data capture capability of a power quality instrument. The IEDs 120 may also each provide and the input/output capability for breaker control. The busses 180a 180b 180c 180d in FIG. 1 are illustrated in single line format. Artisans will appreciate that the busses 180 will typically be three phase, but may also be single phase.

Figure 6:
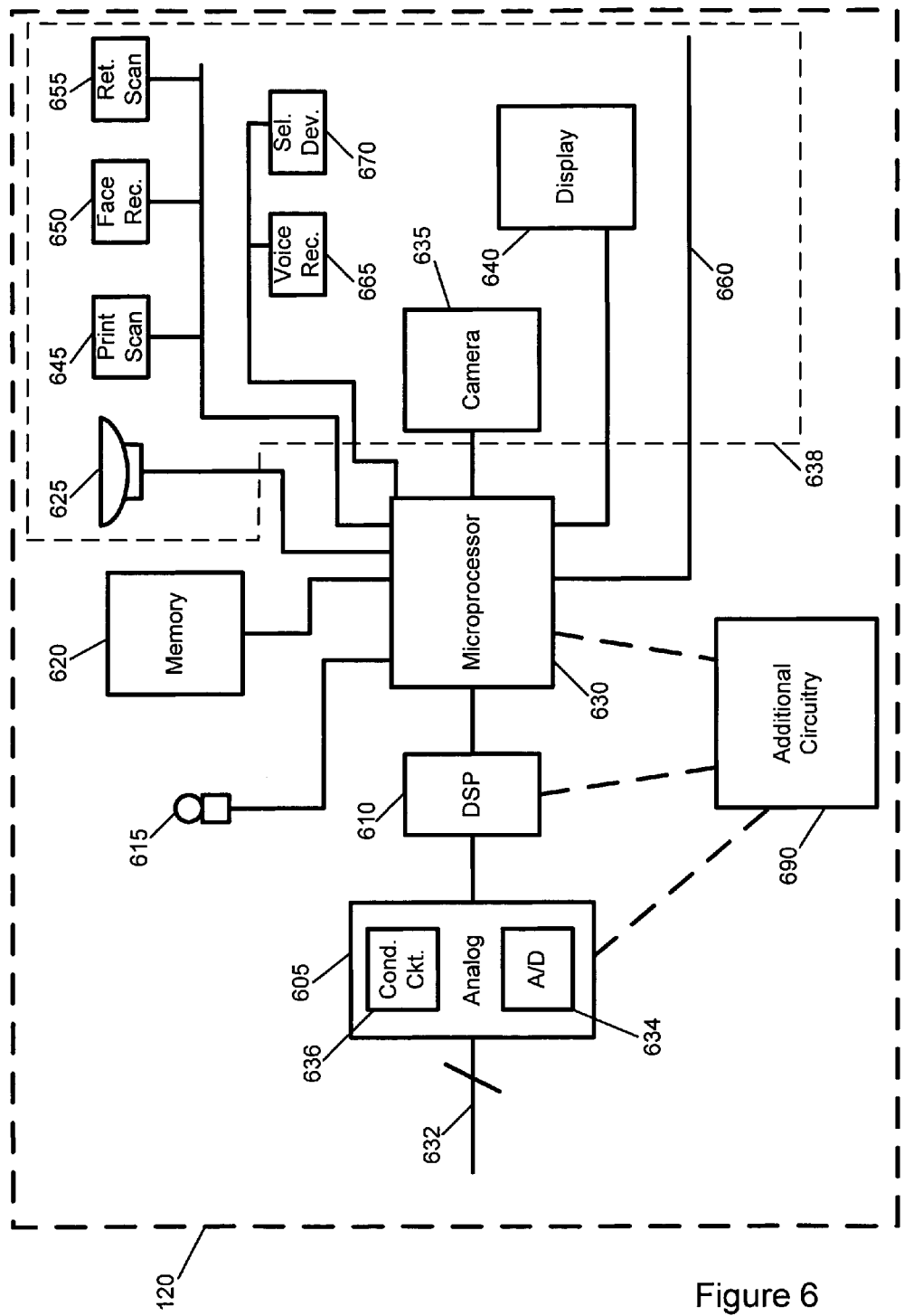
FIG. 6 depicts a block diagram of the internal circuitry of an electronic device illustrated in FIG. 1.

Referring now to FIG. 6, a block diagram of the internal circuitry of an example of one of the IEDs 120 of FIG. 1 is shown. The illustrated IED 120 includes an analog processor section 605, a digital signal processor (DSP) 610, a memory 620 and a microprocessor 630. Although not shown, the IED 120 may also include one or more sensors 122 (FIG. 1) as previously discussed.

Analog voltage and/or current signals, such as from the sensors 122 (FIG. 1), enter the IED 120 along analog inputs 632 and are provided to the analog processor section 605. Other analog signals such as temperatures, pressures, etc. may also enter the IED 120 along the analog inputs 632 and be provided to the analog processor section 605. The IED 120 may also receive and process digital input signals such as pulse signals, contact closures, etc.

The analog processor section 605 contains an analog-to-digital converter 634. The analog processing section 605 also contains conditioning circuitry 636 to condition and/or convert the voltage and/or current signals on analog inputs 632. The voltages and/or currents may be converted to voltages that are compliant with the input requirements of the A/D converter 634. The A/D converter 634 can be contained within the analog section 605, within the DSP 610, or within the microprocessor 630. The A/D converter 634, DSP 610, and microprocessor 630 or any combination of these may be incorporated within a single silicon device. Alternatively, the microprocessor 630 may incorporate DSP 610 functions with its programming and thereby eliminate the requirement for the DSP 610. The A/D converter 634 may convert the voltage signals to digital signals representative of the analog voltage and/or current signals.

The sensors 122 (FIG. 1) may be digital sensors that are able to directly sense electrical parameters in the electric circuit and convert the electrical parameters to signals that are digital samples. The converted signals may be provided directly to the DSP 610 and/or the microprocessor 630. Accordingly, the analog processing section 605 may be unnecessary with regard to sensing electrical parameters of the electric power lines.

The DSP 610 and the microprocessor 630 may be any form of device(s) capable of executing instructions to direct the operation of the IED 120 and direct/provide the functionality described herein. The DSP 610 may also execute instructions to process digital input signals and generate digital output signals. The microprocessor 630 may execute instructions to process digital and/or analog input signals and also generate digital and/or analog output signals. In other example IEDs 120, the IED 120 may include a plurality of independently operating microprocessors 630 and/or DSPs 610.

The DSP 610 may receive samples of voltage and current signals representing electrical parameters of the electric power lines the voltage and current signals may be received through analog conditioning circuitry 605 or from digital sensors. The DSP 610 may execute instructions to perform an orthogonal transform on the samples of the voltage and current. The orthogonal transform may include discrete Fourier transform, fast Fourier transform, discrete cosine transform, waveletts, and eigenvalues of the eigenvectors of the autocorrelation matrix and cross correlation matrix. The orthogonal transform analysis may allow wide bandwidth relaying. Thus, the DSP 610 may determine the frequency content of the signals and perform protection algorithms based on individual or multiple harmonics.

For instance, in the protection of a transformer, it may be advantageous to initiate a breaker trip with the IED 120 if the 3rd harmonic of current is greater than a particular amplitude. In addition, it may be advantageous to initiate a breaker trip with the IED 120 based only on the fundamental frequency component of the current signal. Prior art protective relays typically respond only to the fundamental frequency component. Therefore, if there are significant harmonics, a fuse may trip on overload before the prior art protective relays initiate a breaker trip even though a relay coordination study indicates otherwise. In addition, orthogonal transform analysis may provide the ability to apply different weighting to loads 140 (FIG. 1) at various harmonics depending on how the load 140 reacts to harmonics. In addition, it may be advantageous to trip a breaker 130 (FIG. 1) when certain harmonics that cause the greatest heating or damage in the load 140 are over a limit.

The DSP 610 and/or the microprocessor 630 may execute instructions to generate at least one measurement signal in response to analog and/or digital input signals such as the signals provided by the A/D converter 634 and/or the sensors 122 (FIG. 1). The measurement signals may be an output from the DSP 610 and/or the microprocessor 630 representing the analog and/or digital input signals. For example, the measurement signals may be used to generate values representative of the measurement signals in the display 640. One or more indicators or other devices external to the IEDs 120 may also be provided the measurement signals in analog or digital form. In addition, the measurement signals may be communicated via the communication link 660 to a remote user interface or other device capable of processing and/or displaying the measurement signal.

The DSP 610 and/or the microprocessor 630 may also execute instructions to compute various electrical parameters that are measurement signals using the analog and/or digital input signals. In addition, the DSP 610 and/or the microprocessor 630 may execute instructions to store the measurement signals, electrical parameters, values representative of digital and/or analog signals, setpoints, alarm thresholds, etc. as data parameters in memory 620. Further, the DSP 610 and/or the microprocessor 630 may execute instructions to perform security access. Instructions executed by the DSP 610 and/or the microprocessor 630 may be stored in the memory 620.

The memory 620 may be one or more data storage devices that includes volatile and/or non-volatile memory that is accessible by the DSP 610 and the microprocessor 630. The memory 620 may be at least one magnetic data storage device, such as a hard driver, an optical disk, a tape, etc., and/or at least one electronic memory device such as flash memory, random access memory (RAM), read only memory (ROM), etc. The memory 620 may be located within the IED 120. Alternatively, the memory 620 may be located anywhere else that allows communication with the IED 120. In another alternative, a portion of the memory 620 may be located within the IED 120 and another portion(s) of the memory 620 may be located elsewhere. The memory 620 may store instructions as well as collected and calculated data parameters such as electrical parameters, settings, security codes, operational data parameters and any other information related to the functionality of the IED 120.

The IED 120 of FIG. 6 also includes an interface 638. The interface 638 may include a microphone 615, a speaker 625, a camera 635, a display 640, a fingerprint scanner 645, a face recognition unit 650, a retinal scanner 655, a communication link 660, a selection device 670 and a voice recognition unit 665. One or more of these components may constitute a portion of the interface 638; however, the interface 638 may also include additional components. For instance, the communication link 660 may be used for a user interface that is remote from the IED 120, such as a software package communicating to the IED 120, another IED 120 or any other device.

The interface 638 may be used to access information that is stored in the IED 120. In addition, security access screens, setup information, and/or any other information to be communicated to the operator or an exterior device may be provided by the interface 638. Further, the interface 638 may be used for receipt of information communicated to the IED 120 via the selection device 665 and/or the communication link 660. The selection device 670 may be a keyboard, a mouse, a touch screen or any other mechanism allowing data entry, data manipulation and entry of commends for the IED 120 by a user. Some examples of communication over the communication link 660 would be a request for an HTML web page, a security access code, a software setting, communication from a software package or hardware device to the IED 120, etc. The illustrated IED 120 may also contain additional operationally related circuitry 690 that is not relevant to the present discussion.

Referring again to FIG. 1, a central controller 100 may communicate with the various IEDs 120*a-h* over a communications medium 105. The communications medium 105 may be RS-485, Ethernet, modem, wireless, or any other appropriate communications medium and may contain segments that form part of a LAN, a WAN, an intranet or the Internet. Each IED 120*a-g* is coupled with the communications medium 105 through the communication link 660. The communication link 660 may include wired and/or wireless communication channels. A first IED 120 such as IED 120*a* may also communicate with a second IED 120 such as IED 120*h* over a peer-to-peer communication link 165. In this configuration, IED 120*a* may provide a gateway between IED 120*h* and the communications medium 105. Alternatively, IED 120*h* and IED 120*a* may communicate directly over the peer-to-peer communication link 165.

Selective communication between the IEDs 120 and the central controller 100 may include exchange of power system related information. The power system related information may include power system related data and control signals. The central controller 100 may direct the operation of the IEDs 120 utilizing control signals communicated over the communication medium 105 and the communication links 660 and 165.

The central controller 100 may be a computer or an industrial device that includes a microprocessor, memory and communications peripherals. Alternatively, the functionality of the central controller 100 can be integrated into one or more of the IEDs 120*a-h*. The central controller 100 may include a graphical user interface (GUI) in the form of at least one display and appropriate user interface devices. The user interface devices may include one or more selection devices such as a keyboard, a mouse, a touch screen or any other mechanism that allows a user to enter data and or commands.

The central controller 100 may be programmed with a system analysis model of the power system. The model may include information on the location of feeders 150, transformers, motors, generators, and IEDs 120*a-h*. In addition, the central controller 100 may be programmed with the impedance of cables, feeders 150 and busses 180 and the characteristics of every hardware device connected to the power system (such as detailed steady state models, transient models, operational device limits, and startup curves for motors, breakers, fuses, generators, transformers, etc.). The central controller 100 may also gather operational information from the IEDs 120*a-h*. Using the operational information and the system analysis model of the power system, the central controller 100 may dynamically optimize device settings and coordinate the trip curves and other protection settings provided by the IEDs 120*a-h*.

The trip curves and other settings utilized by the IEDs 120 may be in the form of values, curves or any other format. The protective relaying functionality provided by IEDs 120 may include alarms and/or activation of other hardware in the power system, such as the tripping/closing of the breakers 130. Protection of the hardware within the power system provided by the IEDs 120 may include time and instantaneous overcurrent protection, over/under voltage protection, over/under frequency protection, harmonics protection, voltage/phase balance protection, differential protection, directional protection and any other forms of protection warranted by the configuration and/or hardware in the power system.

Figure 2:
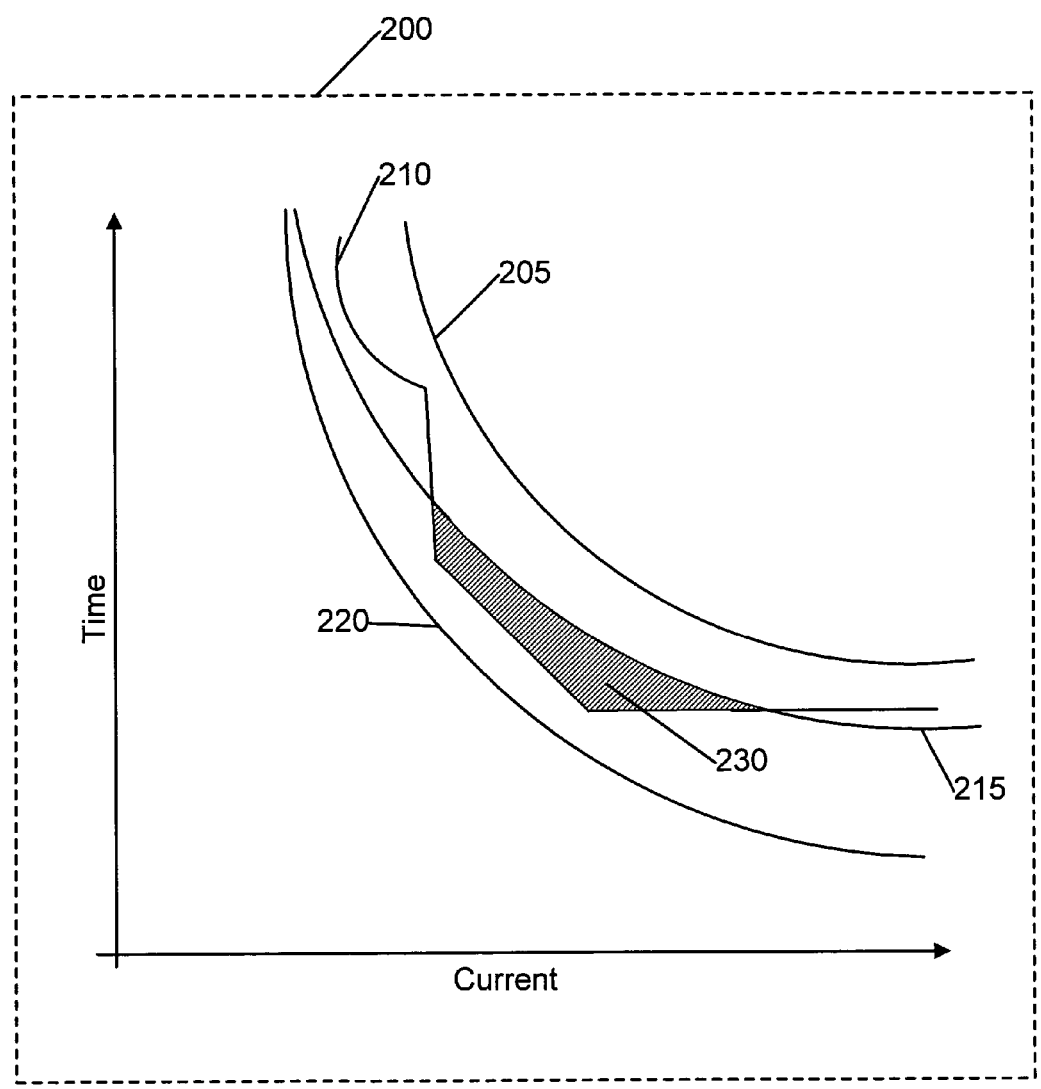
FIG. 2 depicts an exemplary protection curve display of a central controller illustrated in FIG. 1.
Figure 4:
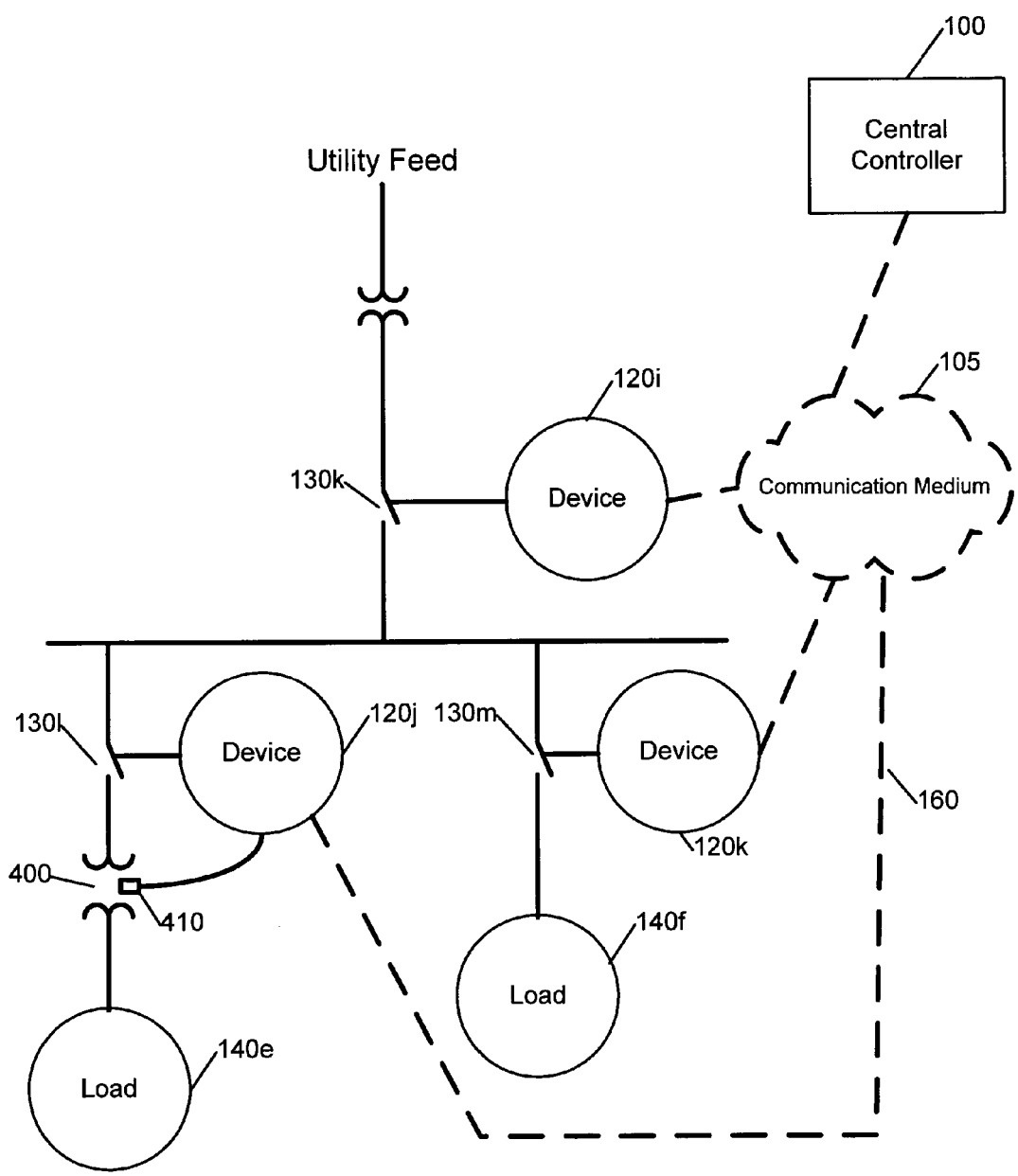
FIG. 4 schematically illustrates another exemplary power system incorporating the devices and system of the present invention.

The central controller 100 has the ability to display various relay overcurrent trip curves or any other settings on a display. FIG. 2 is an example of a relaying trip curve display 200 for an example power distribution system illustrated in FIG. 4. In FIGS. 2 and 4, an example overload damage curve 210 (FIG. 2) for a transformer 400 (FIG. 4) is shown along with a trip curve 215 (FIG. 2) of a local IED 120*j* (FIG. 4) and a trip curve 205 (FIG. 2) of an upstream IED 120*i* (FIG. 4). Using the display of the central controller 100, a user can identify a potential region 230 (FIG. 2) along the overload damage curve 210 where damage may occur to the transformer 400. In addition, the enterprise energy management system 10 can recommend a new trip curve 220 (FIG. 2) for the local IED 120*j* to minimize or eliminate such problems. The central controller 100 may also recommend new trip curves and/or settings based on actual power flow observed in the power system.

Figure 3:
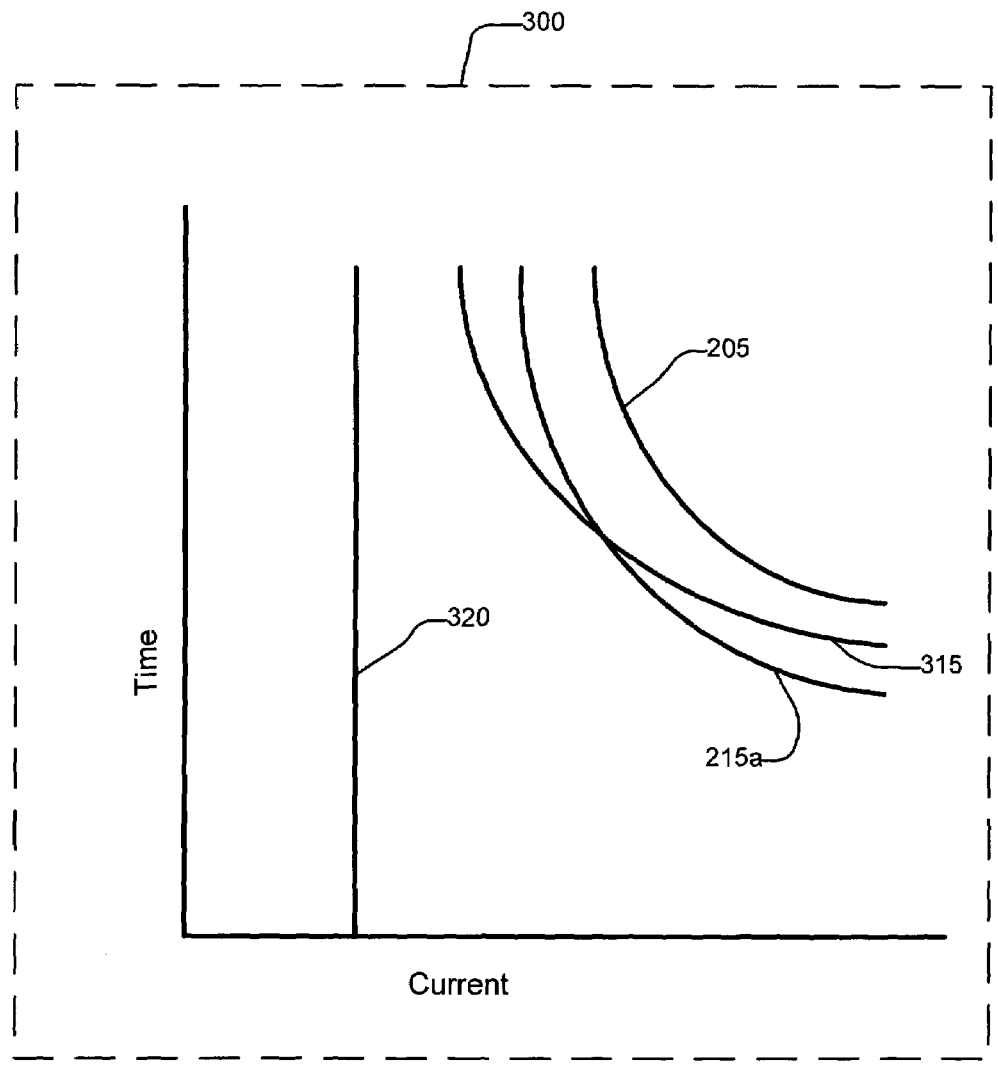
FIG. 3 depicts another exemplary protection curve display of the central controller illustrated in FIG. 1.

The central controller 100 may perform analysis and generate resulting trip curves and settings based on previously gathered knowledge of various components in the power distribution system. This analysis may indicate if an upstream device may trip before a downstream device trips. For example, referring to FIG. 3 another central controller relaying trip curve display 300 is shown based on the power distribution system in FIG. 4. Here, a load 140*f* (FIG. 4) is assumed to be an approximately constant current load and is represented by a vertical line 320 (FIG. 3). In addition, in this example an alternate trip curve 215*a* (FIG. 3) is shown for IED 120*j* (FIG. 4). The current represented by vertical line 320 may be subtracted from the upstream trip curve 205 (FIG. 3) resulting in a resultant trip curve 315 (FIG. 3). In this example, the resultant trip curve 315 indicates that the upstream IED 120*i* may trip a breaker 130*k* (FIG. 3) before the downstream IEDs 120*j* and 120*k* trip breakers 130*l* and 130*m* (FIG. 3), respectively. Breaker 130*k* may trip first since at least a portion of the resultant trip curve 315 is to the left of alternate trip curve 215*a* for IED 120*i*. The user may then use the software in the central controller 100 to modify the settings of the IEDs 120*i-k* or the central controller 100 may recommend new settings. Alternatively, the central controller 100 may automatically set these new settings to the IED 120.

Referring again to FIG. 1, the enterprise energy management system 10 may allow offline programming of trip curves (such as voltage, current, and frequency protection curves) and other settings provided in the IEDs 120. The power system architecture (e.g. system analysis model) and settings can be copied from the central controller 100 to a separate computer 170 (such as a laptop as shown in FIG. 1) over an external communication link 175. The separate computer 170 can then be removed from the enterprise energy management system 10.

A user can program various trip curves and other settings into the computer 170 for the various IEDs 120. In addition, the separate computer 170 may perform offline simulations of the power distribution system. The simulations allow the user to specify faults and protection settings with custom variables, protection curves, etc. The custom variables, protection curves, etc. may be retrieved from the actual IEDs 120 or programmed into the computer 170 offline from the enterprise energy management system 10. All offline programming and simulations can be uploaded to the central controller 100 when the external communication link 175 is reestablished. In addition, any programmed protection curves or settings can be uploaded to the IEDs 120 through communication to the central controller 100 or by connecting directly to a communication port of one of the IEDs 120 (such as 120*d*) via an IED communication link 185 as shown in FIG. 1.

The enterprise energy management system 10 may also temporarily or permanently modify the settings of the protective relaying functionality of each IED 120. In order to do so, the central controller 100 sends a command over the communications medium 105 to the device(s) 120. If communications fail, each IED 120 can fall back to initial settings or maintain the modified settings depending on the application. In addition, the central controller 100 can indicate that the new settings are to be used for only a determined period of time.

Each IED 120 may also store at least two relaying profiles (sometimes referred to as "group settings") as well as any other settings in memory 620 (FIG. 6). This architecture mitigates potential problems with communication interruption due to disconnection, faults, equipment failure, etc. This is especially advantageous when the communications path includes such potentially unreliable communication paths as the Internet. The use of alternate group settings means that the need for high speed communication with IEDs 120 is not required. Group settings can be programmed in a near-real time fashion. The only signal that may be sent in real time is the command to each IED 120 to switch to an alternate group setting.

Figure 5A:
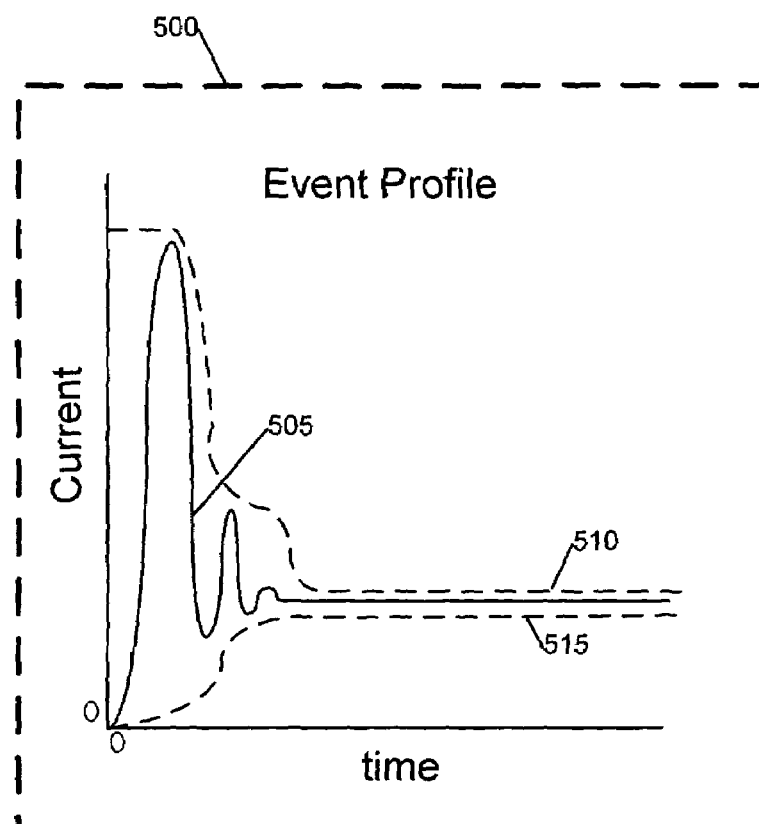
FIG. 5a depicts an event profile upon application of a load in the power system.
Figure 5B:
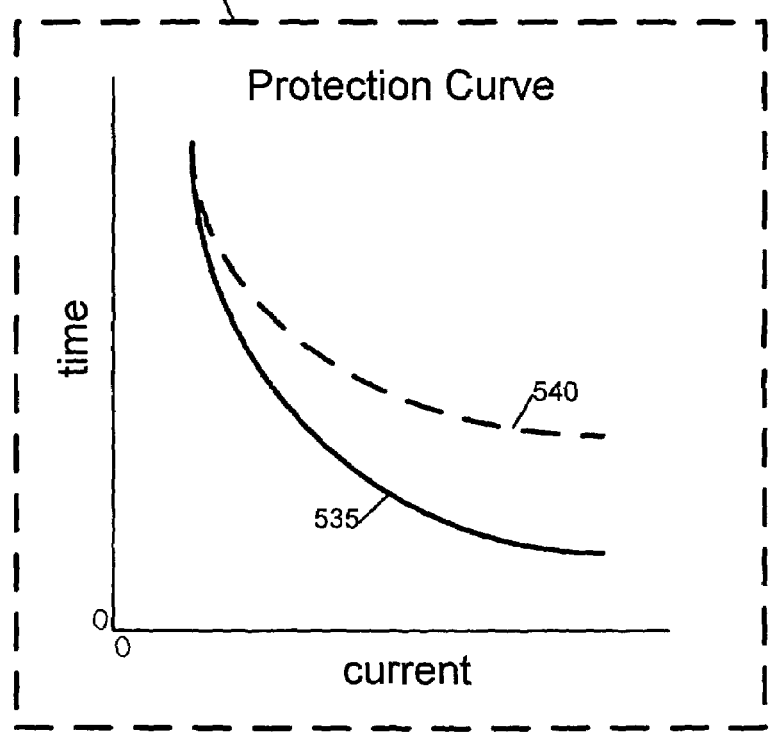
FIG. 5b depicts another exemplary protection curve display of the central controller illustrated in FIG. 1.

The central controller 100 can also modify the protection settings of the IEDs 120 under various conditions. For instance, if the central controller 100 is aware that a motor 140d is about to start, the central controller 100 may temporarily increase the threshold trip current of the IED 120d. This allows for the motor inrush currents during startup, but maintains a lower threshold trip current during running operation. The effect is that the motor 140d startup curve is added to the existing trip curve of IED 120d until the motor is running at full speed. In another instance, FIG. 5b is an example of a protection curve where a relay trip curve 535 is temporarily modified to a temporary relay trip curve 540. Temporary modification may allow for various conditions requiring allowance of an inrush of current such as is shown by FIG. 5a where a startup curve 505 represents the startup current of a motor and an inrush curve 510 represents the maximum allowed inrush current.

Referring once again to FIG. 1, the IED 120 may also store a number of protection curves and other settings in memory 620. The IEDs 120 may selectively operate with these different protection settings and/or curves to either temporarily or permanently replace the active protection curve and/or settings in the IED 120. Selective operation with the different protection settings and/or curves may be based on a signal received from the central controller 100, user input, time of day, digital or analog input status, and/or a measured or calculated signal(s) available to the IED 120. Each of the protection curves and other settings stored in the IED 120 may be accessible from the IED 120 itself, through direct communication with the IED 120, or through the central controller 100.

The central controller 100 may also include artificial intelligence capability to learn based on the system analysis model and information that it has access to (such as weather forecast, power flow during various times of day, time, etc.) and previous breaker trips to conceive a more optimal power flow throughout the power distribution system. The central controller 100 may program the IEDs 120 with the new setting(s) or power curve(s). The new setting(s) and/or power curve(s) can be programmed into one or more available storage spaces within the memory 620 (FIG. 6) of the IED 120. These stored settings can be selectively utilized based on various conditions such as a signal received from the central controller 100, user input, time of day, digital or analog input status, and/or a measured or calculated signal(s) available to the IED 120.

The IED 120 can detect expected temporary events when a temporary protection profile and/or event profile is sent to it. An example event profile is depicted in FIG. 5a, where startup curve 505 is the typical current profile of the event, inrush curve 510 specifies the maximum current profile of the event and minimum curve 515 the minimum current profile of the event. IED 120 can recognize the event and temporarily modify a protection profile and then switch back to the original protection profile after the event occurs.

For instance, if motor 140d is about to start, a temporary event profile may be sent to IED 120d to increase the allowable current to avoid tripping breaker 130c. IED 120d may then detect when the inrush occurs and modify the relay trip curve with information from the event profile specifications so that the event would not trip breaker 130c. An event that does not match the event profile, however, could be detected and cause a trip of breaker 130c. Immediately after the event the IED 120d may return to its pre-existing settings without requiring any communication to the central controller 100. With this type of protection, an unexpected inrush of current outside of the event profile specifications, or immediately following the expected inrush of current is detected and appropriate action(s) taken to protect the system and devices. As an alternative implementation, the central controller 100 could send a modified trip curve to the IED 120d along with a time period where this modified trip curve should be applied. The IED 120d may then implement the new trip curve for the prescribed amount of time.

Since the central controller 100 is fully aware of the settings and readings of the IEDs 120, the central controller 100 may diagnose the reason for a trip of a breaker 130. If the trip is a false trip, the central controller 100 can recommend modifications to the trip settings of the respective IED 120. Alternatively, at the user's option, the central controller 100 can automatically adjust the trip settings of the IEDs 120 after a false trip of a breaker 130 to prevent another false trip in the future. The central controller 100 can learn which trips are legitimate and which are false based on user input in order to make changes to the associated IED's 120 settings, or recommend preventative steps to be taken by the user. The central controller 100 can also recognize impending trips of the breakers 130 associated with the IEDs 120 and warn the user, modify the settings of one or more IEDs 120 and/or initiate shutdown of one or more loads 140 in order to prevent the trip of a breaker 130.

If the user is unwilling to have the central controller 100 automatically modify the protective settings of the IEDs 120, the central controller 100 can operate in monitor only mode. In monitor only mode, the central controller 100 monitors and records various power parameters from the IEDs 120 such as volts, current, power, status of digital/analog outputs, etc. If a trip of a breaker 130 occurs in the power system, the central controller 100 can use this information to determine the cause of the trip. If the trip was a false trip, the central controller can recommend modified settings for the device(s) 120 to prevent the trip in the future. The user can inform the central controller 100 whether the trip was false or not. The central controller 100 may use this information to build a trip database of false and legitimate trips. The trip database may be used in the future when the user decides to allow the central controller 100 to dynamically update the settings of the IEDs 120. In addition, if the trip was a legitimate trip that possibly caused damage to equipment within the power system, the central controller 100 can modify its settings and/or the settings of the IEDs 120 in order to protect against possible damage in the future.

The central controller 100 may include the complete configuration of the power system including all the loads 140, sources 110 and 115, IEDs 120 and interconnections. Therefore, the central controller 100 can analyze the power system and perform "what-if" scenarios. An example of a "what-if" scenario involves the user indicating the desire to add a load 140 on a particular feeder 150. The central controller 100 may analyze and determine whether the proposed load can be added based on the available capacity of the network, relaying protection, etc. This may happen in simulation on the central controller 100 before work is begun to add the load 140. In addition, the central controller 100 can optimize the power system by identifying the best feeder 150 to place a new load 140 on due to its historical record of power flow including peak actual current flow of each feeder 150. Another application is to perform a what-if analysis prior to initiating a control command to a breaker 130. For example, if the operator commands the opening or closing of breaker 130c (for example to start motor 140*d*), the central controller 100 can flag any possible overload conditions or pending trips to the operator prior to performing the actual operation The central controller 100 may also receive local information from each IED 120 as to the breaker status, load information, power measurements, and power quality. The local information may be used to predict relay pickup and to alarm at the central controller 100 if a load 140 encroaches the trip setting of a IED 120. In addition, the local information may be used to alarm on relay pickup, trip, or overload conditions based on the system analysis model.

The IEDs 120 may be capable of performing synchronous impedance calculations across the power distribution system. Synchronous impedance calculations may be performed by maintaining synchronization between each of the IEDs 120 and performing impedance calculations at the point the IEDs are connected in the power system. The central controller 100 may correlate the power system impedances with the system analysis model to determine the location of an electrical fault. In addition, using the system analysis model, the central controller 100 may automatically locate and trip the required breakers 130 to remove the electrical fault from the power system. The central controller 100 may alarm on the electrical fault and display a fault location in the system analysis model on the display screen of the central controller.

The IEDs 120 can be time synced in the manner described in U.S. patent application Ser. No. 09/370,863 from either the central controller 100 or a GPS receiver (not shown). Once the IEDs 120 are time synchronized, they can all begin sampling at the same point in the waveform of the electric power on the power system. This allows the central controller 100 to retrieve the impedance of the power system seen by each IED 120 over communications medium 105 at the same moment in time. The impedance calculation may be made over the same period of time (for instance one cycle) starting at the same point in time due to the dynamic nature of the power system. For example, loads may be continuously switched off and on and therefore vary power consumption. Once the impedance calculation has been made by all the IEDs 120 starting at the same point in time and over the same time period, the impedance seen in the direction of power flow by every IED 120 in the power system is available to the central controller 100.

As the central controller 100 has the ability to communicate with the various IEDs 120 with the time synchronized sampling mentioned above, the central controller 100 can determine the direction of flow of power in the power system. The direction of power flow at each point of IED 120 connection to the feeders 150 of the power system may be determined. Since the central controller 100 contains an accurate systems analysis model of the power system, the impedances of buses 180, cables, feeders, etc. may be known or determined. Therefore, if an electrical fault such as a ground fault 190 occurs in the power system, it is possible for the central controller 100 to isolate the location of the electrical fault in the power system. In addition, the central controller 100 may isolate the electrical fault by tripping the appropriate breakers 130 via associated IEDs 120. The central controller 100 may determine the location of the fault by receiving synchronized real time impedances seen by each IED 120. The central controller 100 may correlate the real time impedance information with the system analysis model and expected power flow of the power distribution system. The central controller 100 can then triangulate the location of the electric fault.

For instance, if all breakers 130 are closed except breaker 130*b* and an electric fault 190 occurs, the central controller 100 may observe fault current flowing towards the electric fault 190 through breakers 130*a*, 130*d*, 130*e*, 130*f* and 130*h*. The central controller 100 may determine that opening breakers 130*d* and 130*h* results in isolation of the electrical fault 190 while not interrupting power to loads 140*a*, 140*b*, and 140*c*.

Due to the central controller's 100 ability to communicate with the various IEDs 120 and the time synchronized sampling mentioned above, the central controller 100 can optimize the flow of power within the power system to reduce $I^2R$ losses. For instance, by measuring the impedance of a plurality of busses 180 and the current flowing through the busses 180, the central controller 100 can estimate the $I^2R$ losses on the busses 180. The central controller 100 can then instruct a modification of power flow to even out the current flow to various loads 140 by communicating with various IEDs 120 to open or close various breakers 130. Since power losses on a bus 180 are proportional to the flowing current ($I^2$) it is advantageous to have the currents balanced between busses 180 for a given resistance, as this will minimize power losses in the power system.

The central controller 100 can use the system analysis model to automatically reroute the power flow upon the failure of power distribution components or a change in the power distribution system. This includes the ability to reroute power flow by automatically opening or closing the breakers 130 and automatic reconfiguration of the settings of the device(s) 120. If the user prefers, the central controller 100 does not automatically perform rerouting, instead, the enterprise energy management system 10 can be configured to suggest a possible rerouting of the power and await acknowledgment from the user to proceed.

The IEDs 120 may query the central controller 100 and retrieve the settings automatically for internal use. This eliminates the possibility of incorrect settings programmed by the person installing the IED 120. In addition, if the settings are manually entered into the IED 120 at the location of the IED 120 and these settings do not match the settings stored in the central controller 100, a screen or indicator may appear at the IED 120 and the central controller 100 indicating a discrepancy. In addition, all settings of the IEDs 120 may be accessible remotely from a central location such as the central controller 100 and can be reprogrammed from that central location.

The central controller 100 may determine the physical location of the IEDs 120 in the power system analysis model by using various pieces of location information. Such location information available to the central controller 100 may include GPS locations, monitoring and tracking power and harmonic signatures, and monitoring power flow. Using location information, the central controller 100 may develop the power system analysis model and determine where the IEDs 120 are physically located. For example, the central controller 100 can determine IED 120*d* is downstream of IED 120*c* and if breaker tie 130*h* is closed IED 120*h* is also downstream of IED 120*c*, etc. In addition, the central controller 100 can query the IED 120 for the longitude and latitude position. The IED 120 may retrieve the longitude and latitude position from a GPS. The central controller 100 may correlate the information with a site map to determine a building and building level where the IED 120 is located within the enterprise.

Alternatively, the central controller 100 can be programmed with the configuration of the power system including all the loads 140, sources 110 and 115, IEDs 120, and interconnections. This provides a system analysis model that is used by the central controller 100 with an ability to make suggestions, predict problems, and perform offline analysis of the power system.

The central controller 100 may also model and control the power distribution system with techniques such as fuzzy, neutral, or stochastic control techniques such techniques may be adaptive. The central controller 100 may verify, adjust, and optimize the values in the system analysis model based on real time measurements, harmonics, and integration of measurements over time and various measured and unmeasured conditions. For instance, if the initial power system analysis model contains approximations and best guesses, the central controller 100 can fine-tune and optimize the power system analysis model so that the model may become more accurate over time as the central controller 100 gathers data about the power distribution system.

The central controller 100 may also take into account variables that affect the system analysis model, such as but not limited to weather, temperature, humidity, wind speed, harmonics, power, energy, voltage, current, impedance, power flow, and demand. The central controller 100 may update the system analysis model using each of these values independently as well as the interrelationship between any and/or all of these variables.

Referring again to FIG. 4, due to the IED's 120 ability to calculate harmonic power flow, the central controller 100 may determine the origin of harmonics and predict their effect on various equipment such as transformer 400. Harmonic current flow within a transformer can adversely affect the lifetime of the transformer since harmonics cause additional loses in the transformer core. Temperature is a main determinant in lowering the life of transformers. The higher the temperature, the lower the lifetime. Typically, one or more sensors 410 are mounted inside and around the transformer 400 to monitor operationally varying parameters such as temperature, pressure, etc. The outputs of these sensors 410 may be fed to the IED 120j which can, for example, trip breaker 130l on over temperature conditions and/or operate cooling devices such as fans to cool transformer 400.

The IEDs 120 of the can also cause fans to operate based on the current flowing through the transformer 400, the harmonic content of the current, the thermal model of the transformer 400, and/or the outside ambient temperature. This allows the cooling to be applied before over temperature conditions occur such that the peak temperature may not be reached. Therefore, an over temperature condition may be predicted based on fundamental and harmonic current flow through the transformer. Since the peak temperature is not reached, the lifetime of the transformer may be increased without significantly affecting the amount of additional power consumed by the fans by running them unnecessarily. This additional fan control allows fans to be used to cool the transformer 400 and extend the operational life of the transformer 400 prior to requiring an interruption in the load. As such, a facility operator has more time to take preventative action, and therefore it is less likely to be faced with an unscheduled outage. In addition, the additional cooling provided by the fan before the transformer 400 reaches a peak temperature may extend the life of the transformer 400. These benefits are achieved without significantly increasing the amount of additional power consumed, as the fans do not run unless the present or predicted future temperature of the transformer 400 indicates that the fans should run.

Since the central controller 100 is programmed with the complete configuration of the power system, changes in the magnitude of electrical faults such as due to the non-constant operation of generators may be accounted for by the central controller 100. Referring again to FIG. 1, if for example, generator 110 is supplying power to the power system and an electrical fault 190 occurs, fault current will flow both from the utility feed 115 and the generator 110. Assuming the impedance of the fault is constant, less current may flow through breaker 130b than if the generator 110 was not producing power. Therefore, the fault current seen by IED 120c may be less with the generator 110 supplying power than with the generator 110 off. In the illustrated power system configuration, this may cause IED 120c to fail to trip breaker 130b or trip breaker 130b after a longer than ideal period of time when the generator 110 is supplying power. In the enterprise energy management system 10, the central controller 100 may reprogram the current trip level of IED 120c to a lower value when generator 110 is producing power. Thus, when electrical fault 190 occurs, IED 120c may still trip breaker 130b within the desired time.

If communications to the central controller 100 were interrupted during the time when electrical fault 190 occurs, the above-described dilution accounting may be performed independent of the central controller 100 by the IED(s) 120 via communication between the IED(s) 120. Alternatively, electrical fault 190 may be detected by the central controller 100 and isolated before IED 120c trips breaker 130b using the previously described triangulation mechanism when communications are not interrupted.

As an additional function, the central controller 100 may operate similar to a differential relay to protect equipment within the power system. For example, when electrical fault 190 is a high impedance fault that does not cause any of the individual protective relaying trip points of the IEDs 120 to initiate a trip of the corresponding breakers 130, the central controller 100 may monitor the power flow seen by the IEDs 120b-e connected to the bus 180c. IEDs 120b-e monitor all current paths to the bus 180c. In addition, calculations of each IED 120b-e may be synchronized. As such, if the sum of the power flow seen by IEDs 120b-e is significantly different from zero, an unintentional current path due to electrical fault 190 is indicated. The central controller 100 may determine this condition and communicate with the IEDs 120b-e to trip the corresponding breakers. This may prevent the bus 180c or other equipment from being damaged by the power dissipation of the electrical fault 190. In addition, instead of being a fault, the current path could indicate an unauthorized current path caused by a person stealing power from the bus 180c. In the same manner as when a fault occurs, power theft can be detected and the location that the unauthorized tap that has been attached to the bus 180c can be found with the central controller 100.

Referring again to FIG. 6, the interface 638 may provide security functionality for the IEDs 120. The camera 635 may be an infrared and/or visual charge coupled device (CCD) or complementary metal oxide semiconductor (CMOS) based imaging device. The camera 635 can be triggered by microprocessor 630 in response to an event detected by the microprocessor 630. For instance if an operator changes a setting in the IED 120, a short video clip of the operator may be stored in the memory 620 of the IED 120. This allows a plant supervisor to determine who caused a change to the power system that resulted in a false breaker trip or identify persons attempting to tamper with the power system.

The camera 635 may also be capable of detecting infra-red light. Accordingly, images in a dark setting as well as temperature rise in conductors, transformers, or equipment can be detected. If a rise in temperature is detected, this can be signaled to the service personal or central controller 100 to respond to the situation and reduce the possibility of damage and/or a power outage. Alternatively, the camera 635 may be a slow shutter camera or any other imaging technology that would allow viewing in low light conditions.

Since the camera 635 can be triggered by the processor 630 in response to events detected by the processor 630 it is possible to record a video clip when an electrical fault occurs in the power system. Thus, events that cause damage or destruction of the facility and/or power system equipment may be captured. If the IED 120 can be recovered after the event, the video images in the memory 620 (which may be non-volatile flash EEPROM) may still be recoverable allowing a post event determination of the reasons for the damage or destruction. Image data may be constantly stored in a circular buffer such that image data may be available prior to the triggering event. This constant recording in a circular buffer may allow pre-event data, event data, and post-event data to be available. The circular buffer may reside in non-volatile memory. In this case, if the device fails before the triggering event is detected and there is not enough time to trigger the camera during a fault, the last time period of stored images in the circular buffer may be available. In addition, other events leading up to the damage or destruction may also be recoverable from memory 620 allowing a post-event determination of the reasons leading up to the damage or destruction. Further, the interface 638 of the IED 120 may include communication with a light detector (not shown). The light detector may be located, for example, inside switchgear within the power system. The light detector may provide indication when events such as an electrical arc occur inside the switchgear. The central controller 100 can retrieve the camera 635 and light detector data in addition to power flows and harmonic disturbances in the power system to determine an overall sequence of events and propagation of electrical faults in the power system.

In addition, the camera 635 in combination with the processor 630, the communications link 660 and the central controller 100 may allow an operator to be viewed in real time by a supervisor or remote support personnel. The display 640 on the IED 120 can also display images communicated to the IED 120 over the communications link 660. The display 640 may be a graphical user interface (GUI) that is an electra-optical device such as a liquid crystal display ("LCD"), a cathode-ray tube ("CRT") display, an electroluminescent display ("ELD"), a heads-up display ("HUD"), a plasma display panel ("PDP"), a vacuum fluorescent display ("VFD"), or a touch-screen display. The microphone 65 and speaker 625 at the IED 120 may be used by an operator to interact with a supervisor or remote support personal using technology such as voice over internet protocol (VOIP) while diagnosing problems with the power system. The central controller 100 (FIG. 1) may also include a microphone and a speaker. Since the central controller 100 nay be located geographically distant from the IED 120, this allows expertise of the supervisor to be disseminated without the supervisor traveling to the various locations where the IEDs 120 are located.

The IED 120 may also store in memory 620 the status of various digital inputs such as those provided by digital input signals to the IED 120. The digital inputs may be stored as events that include the time of transition of the digital input. Since all the IEDs 120 within a power system may be time synchronized, the digital input statuses over a given period of time can be retrieved from each of the IEDs 120 by the central controller 100. The central controller 100 can then display a digital fault recorder representation of digital inputs from various IEDs 120 across the power system. If the digital inputs are connected to sources such as breaker status indications, relay status indications, etc., a user can use the digital fault recorder representation to diagnose and track the effects of a power system event such as an electrical fault without having to install dedicated digital fault recording equipment.

Referring now to FIGS. 1 and 6, the IEDs 120 may provide separate secure access to parallel operating protective relaying, metering, power quality and breaker control capabilities. The microprocessor 640 may utilize the memory 620 to execute instructions to provide separate security access to one or more concurrently operating IED functionalities within the IED 120. The different IED functionalities operating in parallel in the IED 120 may be fully configurable by a user and stored in memory 620. As used herein, the term "IED functionality" or "IED functionalities" is defined as different categories of power system related monitoring and/or control that the IED 120 may concurrently provide. The IED functionalities include a protective relay functionality, a billing power monitoring functionality, a power quality functionality, a breaker control functionality, a logic based decision functionality, a sequence of event recording functionality and/or a data capture functionality. The concurrently operating IED functionalities may share the same analog circuitry 605, DSP 610, memory 620, microprocessor 630 and interface 638. Alternatively, the IED 120 may include multiple microprocessors 630 executing instructions independently and concurrently to separately perform one or more IED functionalities.

Each of the IED functionalities may include one or more functions. The functions may be related to the respective IED functionality. Security access to the function(s) within the IED functionality(s) may be fully configurable by a user. The functions may include individual data parameters such as, a KWH reading, a voltage reading, a current reading, a power factor reading, a relay setting, a KWH pulse setting, a harmonic alarm setting, a breaker control capability setting, a calculation constant, an analog input range, a current transformer current ratio, etc. Alternatively, groups of functions such as all relay related data parameters, all metering related data parameters, all breaker control related data parameters, etc. may be designated in the different IED functionalities.

Mutually exclusive functions may also be included in each of the IED functionalities. A mutually exclusive function is defined as a function that is accessible from one or more first IED functionalities but not accessible from one or more second IED functionalities. In other words, a mutually exclusive function is a function that has been designated as accessible only within certain of the IED functionalities. Thus, within other IED functionalities, the same mutually exclusive function is not accessible. Secure access to mutually exclusive functions is also fully configurable by a user and storable in memory 620.

Each of the IED functionalities may be accessed with one or more security accesses that are included as part of each of the IED functionalities. The same security access may be included in multiple IED functionalities. As used herein, "security access", "secure access" or "access" refers to the capability to view, manipulate, capture and/or change data parameters such as, settings, signal parameters, calculation constants, alarm limits, etc. within the IEDs 120.

A security access may be enabled with a user identification (user ID). The user ID is a security signal provided to the IED 120. Enablement of a security access with a user ID allows the user access to the corresponding IED functionality. The user ID can be, but is not limited to, a security code, a permissive signal and/or any other form of indication of the identity of a user. User IDs may be established and stored in the memory 620 of the IEDs 120. Alternatively, established user IDs can be stored in the central controller 100 and accessed by the IEDs 120. The storing of the user ID described within this document may included processing at least a portion of the user ID through a function such as an one-way hash function and the resultant one-way hash of the at least portion of the user ID would be stored rather than storing the user ID directly. In addition to verifying the identification of a user or group of users, each of the stored User IDs may also include indication of the security access available to the user(s). Accordingly, a user ID entered by a user may be compared to the stored user IDs to find a match. The matching of user ID described within this document may include processing at least a portion of the user ID through a function such as an one-way hash function such that the stored user ID that may contain the same one-way hash result would be found as a match. When a match is identified, the identity of the user has been verified and the security access available to that user (e.g. the IED functionality(s) accessible to the user) may be determined.

Each of the user IDs may provide separate security access to functions within one or more of the concurrently operating IED functionalities. Accordingly, a first user ID may enable a first security access to a first IED functionality, and a second user ID may enable a second security access to a second IED functionality operating in parallel with the first IED functionality. For example, a relay technician may have a user ID that enables secure access to the relay functions of an IED 120 and a power quality engineer may have a different user ID that enables secure access to power quality information in the IED 120. Thus, the relay technician may view, manipulate and/or modify functions related to the relay protection settings but not be allowed to access power quality related functions such as, a reset of kWh accumulation in the IED 120. Similarly, the user ID of a meter technician may deny access to adjust relay settings on the IED 120 but may allow access to the reset of kWh accumulation.

This allows a single IED 120 to concurrently provide the functionality of two or more otherwise separate devices while maintaining security of access as if the single IED 120 were two or more separate secure devices. For example, a single IED 120 used at a billing point to meter power flow may have separate security access for the seller of power and the consumer of the power. The independent and parallel security access may prevent tampering with other the party's information while allowing both parties secure access to different IED functionality of the IED 120 to confirm power conditions and readings.

The IED 120 may also include layers of security access within an IED functionality. For example, a first user ID may enable secure access to an IED functionality; however a mutually exclusive function within the IED functionality may only be accessible when enabled with a second user ID. For example, a relay trip setting may only be viewable upon entry of a first user ID to enable a first security access. If, however, modification of the trip setting is desired, a second user ID may be entered to enable a second secure access to a different layer of the same IED functionality. The second user ID may be a supplement to the first user ID or may be a different user ID to allow secure access to the mutually exclusive further secured data within an IED functionality.

An example of a mutually exclusive group of functions in the IED 120 would be when a user tried to access the setup area of an IED 120 providing both protective relay functionality and billing power metering functionality. A relay technician would expect to see relay setup values while a meter technician would expect to see meter values. While there may be a further layer of security access required to change any registers within the IED 120, a user ID may be required to simply display the appropriate registers.

In another example, if an IED 120 is being used by two at least partially independent parties, based on the user ID entered, the IED 120 may know what parameters or format to make available to the user. This may be important when two different users have different reporting, monitoring and configuration requirements. Further to the previous example when the IED 120 includes a billing power meter functionality, the provider of electricity may want to log and display peak KW values on a month-by-month basis. The electricity consumer, on the other hand, may want a log of hour-by-hour peak KW and KVAR values. A user ID may be required before the information is displayed or communicated over the communication channel 660. Thus, each party may only see information of interest and not be confused by each others information that may be stored within the IED 120.

The IED 120 may also store multiple user IDs in memory 620 for secure access to functions within one or more of the IED functionalities. For instance, one user ID may allow the tripping of a breaker 130 associated with an IED 120, but not the adjustment of relay protection setting(s) of the IED 120. For example, a power supplier, such as a utility, with a first user ID may have secure access to a first IED functionality to configure the billing power metering data, while a power consumer such as a plant supervisor with a second user ID may have secure access to a second IED functionality to configure relay protection setting(s). In addition, a power system consultant with a third user ID may have secure access to a third IED functionality to make use of the power quality functionality of the IED 120. Each of the first, second and third user ID's allow secure access but also bars access to IED functionality outside of their responsibility.

A single IED functionality may also be shared by different users. Such a shared IED functionally may be accessed using a shared user ID or shared security signal. A shared IED functionality may be accessed by one or more users that would not otherwise have access to the same IED functionality. For example, a user who is a relay technician and a user who does power quality analysis would each have separate user IDs providing separate secure access to different IED functionalities that may include mutually exclusive functions. In addition, these users may each have an additional shared user ID to provide access to an IED functionality that is accessed by both the users, such as the tap settings on a sensor. The shared user ID may be the same user ID for each user having access to the shared IED functionality. Alternatively, users with different shared user IDs may be provided access to the same shared IED functionality.

The user ID or security signal may include a security code in the form of a sequence of characters or sounds that enable secure access to one or more IED functionalities within one or more of the IEDs 120. The security code can be provided to the IED 120 in the security signal via the interface 638. Accordingly, the security code may be transmitted from an external device over the communication medium 105 and the communication link 660. Alternatively, the security code may be provided in the security signal from a biometric device such as the microphone 615 (voice recognition), the fingerprint scanner 645, the face recognition unit 650 or the retinal scanner 655.

The entry of the security code may be initiated with a security access entry provided in a graphical user interface (GUI). The security access entry may be a pop-up box in a display, an indicator or any other signal that prompts for entry of a security code. For example, the security access entry may be a data entry pop-up box generated in the display 640 of the IED 120. Alternatively, the security access entry may be provided on a remote device, such as the central controller 100. The security access entry may prompt for entry of a user password, prompt for activation of a biometric identification device, etc.

Interaction with the security access entry may involve a selection device. For example, a user may initiate the fingerprint scanner with the selection device 670 in the form of a keypad by selecting an option on the display 640 of the IED 120. In another example, the selection device may be a touch screen associated with a remote device, such as the central controller 100 (FIG. 1).

The user ID or security signal may also include a permissive signal. The permissive signal may be one or more analog and/or digital signals provided to the IED 120, such as the closing of a switch or a visual sensor that indicates a condition has been met. For example, the permissive signal may be a visual or electrical detection of a closed door. The permissive signal may also indicate that an electrical signal meets a predetermined condition. For example, a sensed electrical signal such as the current measured by the sensors 122 being below a determined threshold may be the permissive signal. Another example predetermined condition for a permissive signal is a lockout indication. Secure access to an IED functionality may not be enabled until a corresponding circuit breaker 130 is indicated as locked out by a lock out mechanism.

A permissive signal may also be included in a user ID to enable access to IED functionality(s) only during certain time periods. This allows, for instance, a worker with a certain user ID to control a breaker 130 for load shedding only during certain times of the day. For example, a supervisor can restrict access to a particular trip control(s) to avoid shedding a time critical load during a critical time of operation. A permissive signal included in a user ID may also allow access functions of the IED 120 only during certain power system site conditions. For instance, this disallows a worker with a user ID that enables secure access to the breaker control functionality from remotely energizing a circuit via the central controller 100 by closing a breaker 130 (FIG. 1) if a lockout mechanism or lockout contact was used to protect the safety of a service worker. In another instance, a worker with a specific user ID that enables secure access with a permissive signal may not be able to trip a breaker 130 that is running a fan, if a piece of operating equipment, such as a transformer, requires that fan to run.

The security code and permissive signal may be used alone or in combination as part of the user ID (security signal). For example, a security code may enable partial secure access to configure a breaker control functionality in the IED 120, where, a permissive signal is required for full access. The user ID may also include the use of authentication tokens such as keys, a photo id, a smart card, corporate badges or any other form of user recognition technique. A smart card is a tiny secure crypto processor embedded within a credit card-sized card. Smart cards are defined by the ISO/IEC 7816 series of standards. Security access may be made more secure by using authentication tokens in combination with security codes and/or permissive signals as the user ID.

A prompt for a user ID to enable secure access to IED functionality within the IED 120 may be initiated with the security access entry each time entry into a secure IED functionality is requested by a user. A prompt for a user ID may also be initiated with the security access entry when a function within an IED functionality, such as access to a memory location, is requested by a user. Alternatively, a prompt for a user ID may be initiated periodically with the security access entry during interaction with the IED 120 to confirm the user's identity and to confirm the information accessible to that user. In addition, what setup or control should be allowed to be manipulated by the user may also be confirmed.

The user ID received by the IED 120 in the form of the security signal may be compared to a determined list of user IDs with secure access to one or more respective IED functionalities. The list of user IDs may be stored in memory 620. Alternatively, the list of user IDs may be stored elsewhere, such as in the central controller 100 (FIG. 1) and provided to the IED 102 via the communication link 660. If the user ID matches one of the stored user IDs, access is granted to the IED functionality(s) identified by the stored user ID as accessible. Only if the user ID matches one of the stored user IDs would access be granted to view and/or make a change to a function such as a memory location within an IED functionality.

The IED 120 may also provide for user ID creation using the interface 638. In addition, the IED 120 may enforce user ID standards such as minimum complexity requirements and expiration. When the user ID includes a password, the IED 120 may enforce password standards such as length, character, complexity, and expiration. For example, the IED 120 may not allow a password due to a lack of suitable length (e.g. number of characters), lack of use of complex characters and/or lack of suitable complexity.

The IED 120 may also disallow use of a common name or word as a password or may require a mixture of letters and numbers to create a password. Expiration may involve replacement at determined intervals of user IDs to maintain secure access. The IED 120 may also revoke user IDs that are no longer in use or that are suspected of being compromised. For example, after a determined number of failed attempts to enter a user ID or other indications that the user ID is being used by someone other than the authorized user, the IED 120 may refuse access with that user ID.

The user ID may also include operation of a biometric identification device such as the fingerprint scanner 645, the face recognition unit 650, retinal scanner 655 and/or the voice recognition scanner 665 to provide user identification. The face recognition scanner 650 may operate in conjunction with the camera 635 and capture an image of a users face and perform matching with stored images. Similarly, the voice recognition unit 665 may operate with the microphone 615 to capture sounds and perform matching to stored sounds. Biometric security can also be provided by biometric identification devices such as a blood test scanner, a breath scanner, a bone mass scanner or any other form of user identification based on physical characteristics of a user.

The biometric identification devices may be integrated with the IED 120 or may be located in one or more auxiliary components coupled with the IED 120. This allows for the identification of a user and determination of the level of secure access to the IED 120 without the necessity of the user to remember a password. The biometric identification device(s) may provide at least part of a security code and/or a permissive signal when a user is identified.

In the case of the fingerprint scanner 645, a sensor scans the users fingerprint, and compares the scanned print with known fingerprints. The fingerprint scanner 645 may be an optical type, a capacitive type, a thermal type, an RF-imaging type or a mechanical type sensing method. The fingerprint scanner 645 may output a raster-scan image of fingerprint features.

The raster-scan image may be characterized and an attempt to match the scanned print is made to determine a user ID associated with the image. When a match is found, the fingerprint scanner 645 may provide at least a portion of a user ID in the form of a security code to the IED 120. The security code may give the user appropriate access to functions such as a value, memory location, or setup register within one or more IED functionalities within the IED 120. In addition, based on the security code, access may be given to components coupled with the IED 120 such as another IED 120.

Figure 7:
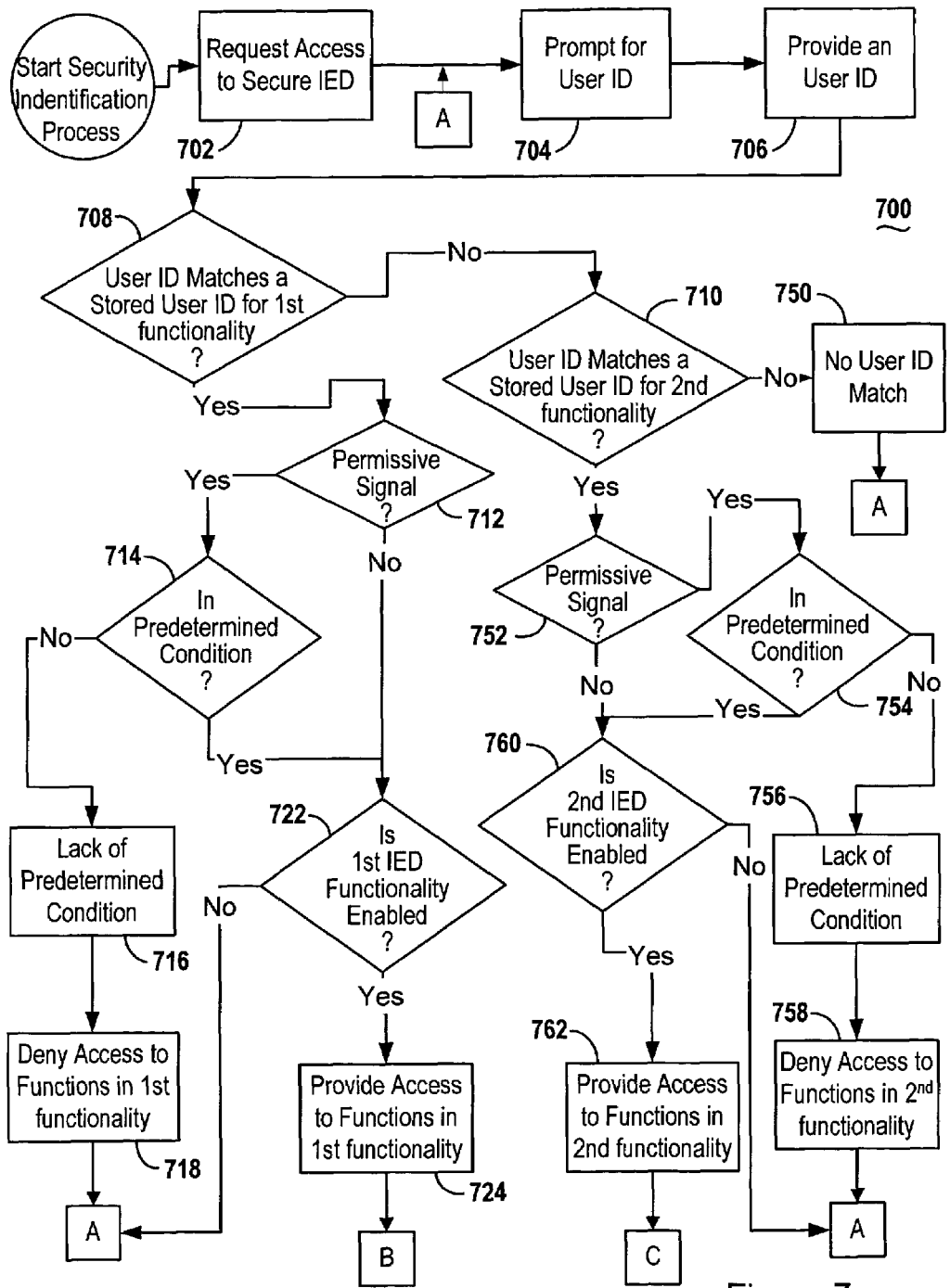
FIG. 7 depicts a first part of a process flow diagram of a security identification process for the power system of FIG. 1.

In FIG. 7, an example security identification process flow diagram is shown. The security identification process may be used to determine what access should be allowed or what content should be displayed when one of the concurrently operating IED functionalities within the IED 120 is requested. The security identification process may be stored as instructions in the memory 620 of the IED 120 and executed by the microprocessor 630 and/or the DSP 610. At block 702, the security identification process starts when a user requests access to secure information within an IED 120. At block 704, the IED 120 may prompt for a user ID with a secure access entry displayed on the display 640 of the IED 120 or displayed on a remote device such as the central controller 100.

At block 706, a user ID in the form of a security signal may be provided to the IED 120 using the selection device. The user ID may be received via the interface 638. For example, the user ID may include a security code and/or a permissive signal received from a remote device that is communicating with the IED 120 through communication link 660. Alternatively, the user ID may include a security code received from face recognition by the face recognition device 650, fingerprint recognition by the fingerprint scanner 645, retina recognition by the retinal scanner 655, voice recognition from the voice recognition unit 665, a smart card, a security key, a blood testing scanner, a breath scanner and/or a bone mass scanner, etc. Further, the user ID may include a permissive signal.

Once the user ID is received, the IED 120 compares the user ID to stored user IDs that provide access to a first IED functionality of the IED 120 at block 708. If there is no match of the user ID and the stored user IDs associated with the first IED functionality, the user ID is compared with stored user IDs that provide access to a second IED functionality of the IED 120 at block 710. If at block 708, the user ID matches a stored user ID associated with the first IED functionality, it is determined if there is a permissive signal such as enablement of a safety lockout mechanism, the state of a digital input, within a determined time period, etc. included in the user ID at block 712. If a permissive signal is involved, it is determined if the permissive signal is in the predetermined condition to enable access to the first IED functionality at block 714. If the permissive signal is not in the predetermined condition, the IED 120 indicates lack of the predetermined condition at block 716. At block 718, the IED 120 denies access to the first IED functionality and the operation returns to block 704 to request another user ID.

If the permissive signal is in the predetermined condition for access at block 714, it is determined if access to the requested secure information within the first IED functionality is enabled by the user ID at block 722. If secure access is not enabled with the user ID, the operation returns to block 704 to request another user ID. If secure access is enabled by the user ID, secure access to at least one function and/or at least one mutually exclusive function within the first IED functionality is provided at block 724. Returning to block 712, if there is no permissive signal included in the user ID, the operation proceeds to block 722 and determines if access to the requested secure information is enabled by the user ID.

Figure 8:
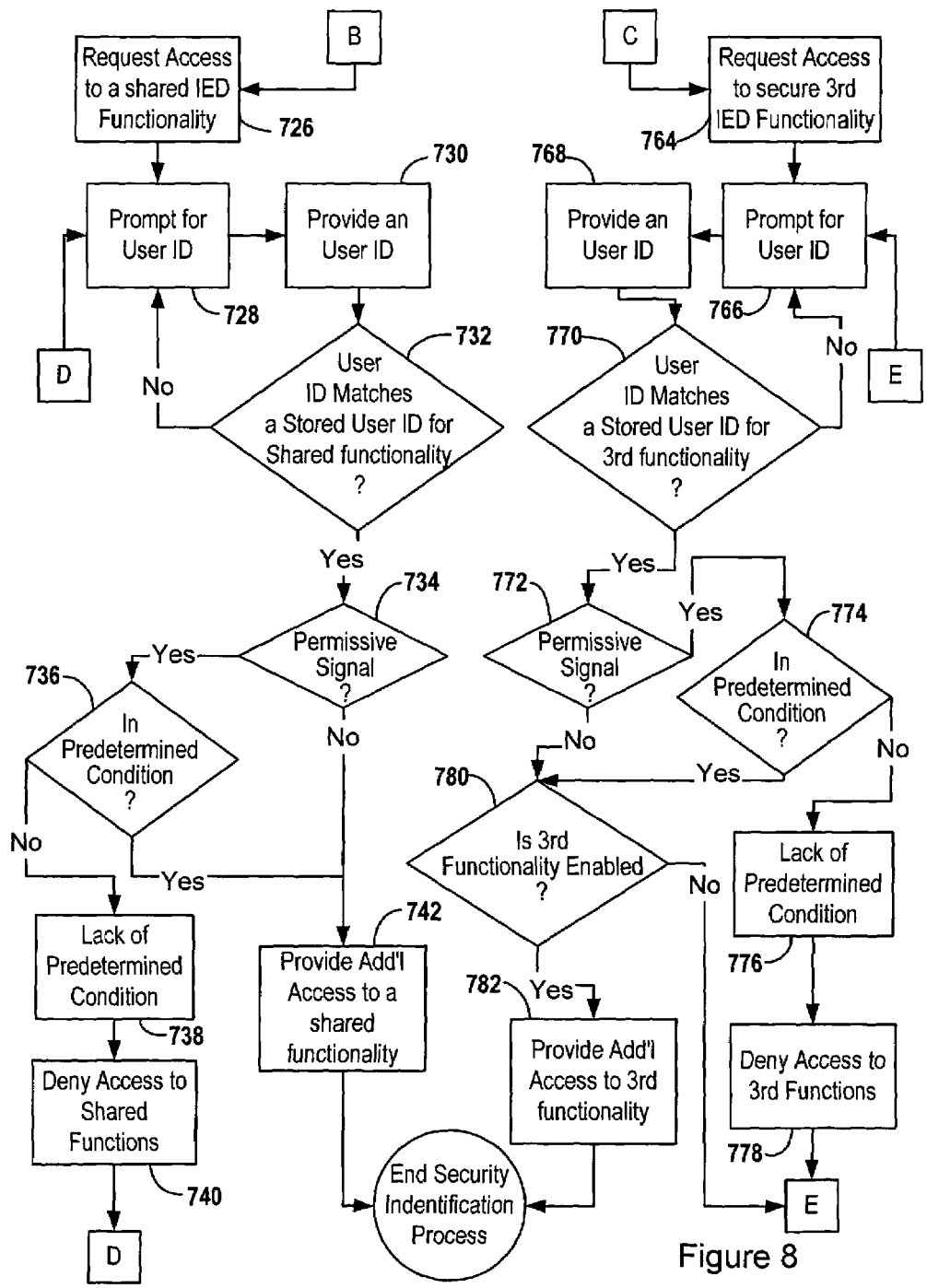
FIG. 8 depicts a second part of the process flow diagram of FIG. 7.

Referring to FIG. 8, at block 726, the user may request access to a shared IED functionality not enabled for access by the user ID providing access to the first IED functionality. In response to the request, the IED 120 may prompt for entry of a user ID with the security access entry and the interface 638 at block 728. At block 730, a shared user ID in the form of a security signal may be provided to the IED 120 with the selection device via the interface 638. The IED 120 compares the shareduser ID to the stored user IDs that provide access to the shared IED functionality at block 732. If the shared user ID does not match the stored user IDs, the operation returns to block 728 to prompt for another user ID. If the shared user ID does match one of the stored user IDs, it is determined if a permissive signal is included in the shared user ID at block 734.

If consideration of a permissive signal is included, it is determined if the permissive signal is in the predetermined condition at block 736. If the permissive signal is not in the predetermined condition, the IED 120 indicates lack of the predetermined condition at block 738. At block 740, the IED 120 denies access to the shared IED functionality and the operation returns to block 728 to prompt for another user ID. If the permissive signal is in the predetermined condition at block 736, the user is provided additional access to the shared IED functionality at block 742 and the security identification process is completed. Returning to block 734, if consideration of a permissive signal is not included, the user is provided access to the shared IED functionality at block 742 and the security identification process is completed.

Referring again to FIG. 7, if the user ID does not match a stored user ID associated with the second IED functionality at block 710, the IED 120 indicates lack of a user ID match at block 750 and the operation returns to block 704 to prompt for another user ID. If at block 710, the provided user ID matches a stored user ID that provides access to the second IED functionality, it is determined if there is a permissive signal included in the user ID at block 752.

If a permissive signal is involved, it is determined if the permissive signal is in the predetermined condition to enable access to the second IED functionality at block 754. If the permissive signal is not in the predetermined condition, the IED 120 indicates lack of the predetermined condition at block 756. At block 758, the IED 120 denies access to the second IED functionality, and the operation returns to block 704 to request another user ID. If the permissive signal is in the predetermined condition for access at block 754, it is determined if access to the second IED functionality is enabled by the user ID at block 760. If access is not enabled, the operation returns to block 704. If access is enabled by the user ID, viewing, manipulation and/or editing of the second IED functionality is provided at block 762.

Referring again to FIG. 8, at block 764 the user with access enabled to the second IED functionality may request access to a third IED functionality. The IED 120 prompts for entry of another user ID with the security access entry and the interface 638 at block 766. Another user ID in the form of another security signal is initiated with the selection device and received by the IED 120 via the interface 638 at block 768. At block 770, this user ID is compared to stored user IDs that provide access to the third IED functionality. If the user ID does not match any of the stored user IDs associated with the third IED functionality, the operation returns to block 766 to prompt for another user ID. If at block 770, the user ID matches a stored user ID associated with the third IED functionality, it is determined if there is a permissive signal included in the user ID at block 772.

When a permissive signal is involved, it is determined if the permissive signal is in the predetermined condition to enable access to the third IED functionality at block 774. If the permissive signal is not in the predetermined condition, the IED 120 indicates lack of the predetermined condition at block 776. At block 778, the IED 120 denies access to the third IED functionality, and the operation returns to block 766 to request another user ID. If the permissive signal is in the predetermined condition for access at block 774, it is determined if secure access to the third IED functionality is enabled with the user ID at block 780.

If secure access to the third IED functionality is not enabled, the operation returns to block 766 to prompt for another user ID. If secure access to the third IED functionality is enabled, access is provided to at least one function and/or at least one mutually exclusive function within the third IED functionality at block 782 and the security identification process ends. Returning to block 772, if consideration of a permissive signal is not included in the user ID, the operation proceeds to block 780 to determine if secure access to the third IED functionality is enabled.

Referring again to FIG. 1, the IED 120 may also be programmed with any protection curve or other protection setting. Thus, the IED 120 may execute instructions to emulate the protection of one or more protective relays. Existing digital protective relays emulate the protection curves designated in the appropriate ANSI standards using approximately 8 points and linearly interpolating between the points. The IEDs 120 may use at least 256 points. This allows the IEDs 120 to more closely follow the ANSI standard curves and to accurately emulate existing stand alone protective relays that may not follow the curves very precisely. Thus, the IED 120 may be easily retrofitted to replace existing protective relays without the need to perform new coordination studies.

The IEDs 120 may also perform true breaker wear monitoring using $I^2T$ and $I^3T$ methods by monitoring the status signals obtained from the breaker aux contact(s) or monitoring harmonic signals and recognizing the harmonic signature of the breaker operation. The advantage of monitoring the breaker aux contact(s) or monitoring the harmonic signals is that only the time the breaker is operating is included in the $I^2T$ and $I^3T$ methods. Traditionally, the time when the signal is sent to operate a breaker 130 is used as the period of time during which the breaker 130 is operating. The operating time is larger than the time period of the actual breaker operation due to signal propagation delay, mechanical operation delay, etc. The breaker wear is based on the breaker operating time. If the determined operating time is longer than actual operating time, the calculated breaker wear may also accumulate faster than the actual breaker wear. Thus, the breaker 130 may be replaced sooner than required. Since the IED 120 may more closely determine actual operating time, the breaker wear calculated with the IED 120 is much closer to the actual breaker wear and may be significantly more accurate. Accordingly, the breaker can be in use for a longer period of time before it needs to be replaced.

The central controller 100 may also receive all power quality information, status, and readings from each of the IEDs 120. This information may be used for an advanced power quality analysis where the waveforms, real time measurement, and status of each IED 120 is integrated with the system analysis model into a power quality analysis. This advanced power quality analysis is able to step the user through the sequence of events that caused a system disturbance or caused a breaker 130 to trip. This information may be used to determine what happened to cause the power system disturbance. In addition, the central controller 100 can make a suggestion if a protective relay setting should be changed to reduce the chance of a future disturbance.

The central controller 100 and IEDs 120 may also include a web-enabled interface that can be used with a standard browser or through customized web software. This interface may use standard protocols to allow easier access through various firewalls. In addition, the web-enabled interface of the IEDs 120 may allow communication directly to the IEDs 120. The web enabled central controller 100 and IEDs 120 allow end users or consultants to view the real-time status of the power system and determine corrective actions if necessary. This is an improvement to relying on an offline study as the real-time information provided through the web interface allows consultants to provide consulting services 24 hours a day, 7 days a week.

The central controller 100 may dynamically change settings based upon changes in the power distribution system. Such changes may be, but are not limited to, opening or closing breakers, starting or stopping motors or generators, addition or removal of loads from the power system, enabling/disabling power factor controller equipment, addition or removal of alternate supplies of power, etc.

The central controller 100 may also include device group settings. The device group settings may allow the user to group various IEDs 120 to a specific device group. Settings within the device group can be changed as a whole or individually. This allows multiple configuration and settings to be implemented quickly and easily on the device group.

Referring once again to FIG. 1, the central controller 100 may use the high speed communication of power parameter information from multiple IEDs 120 to calculate the power quality and power parameters associated with a virtual IED 125. The central controller 100 may use this calculated information to operate a breaker 130i and calculate power parameters. This high-speed communication and calculation of a virtual IED 125 may allow the power distribution system to save the cost of a redundant LED. An instance where this is used occurs when all the power inputs and outputs of a bus have an IED 120 installed with the exception of one of the power inputs or outputs. In the example illustrated in FIG. 1, for instance, the load 140b has no IED 120 installed to monitor its power parameters. In this case, the central controller 100 may use the high-speed communication from the IEDs 120e-g to calculate what the power output would be to the feeder 150b. Protection and power quality functionality may be similarly performed. In addition, breaker control of breaker 130i may be provided by another IED 120, such as IED 120g as illustrated. This effectively eliminates the need for a physical IED 120 at that point in the power system.

Breakers 130 can be of various types such as SF6, vacuum, oil, etc. The design of breakers can take into account arcing, re-striking, etc. as the breaker's contacts are separated. For a given breaker technology, the effect of the phenomena on the life of the breaker is less detrimental if the breaker begins opening at a particular point in the voltage or current waveform. For instance, if a breaker starts opening just before, or at the zero crossing of the current waveform, no arc or only a very weak arc may be formed and breaker wear may be much less than if the breaker started opening near a peak of the current waveform.

The IEDs 120 may monitor the voltage and current flowing through an associated breaker 130 and can delay the trip signal to the breaker 130 in order that the contacts begin opening at a given point in the waveform of the voltage or current. The desired point in the waveform may be programmable (either directly into the IED 120 or through the central controller 100). The IEDs 120 may also take into account the delay between when the trip signal is generated and when the contacts of the breaker begin to separate. The IEDs 120 can be programmed with an initial estimate of this delay and the IEDs 120 may monitor the voltage and current through the breaker during subsequent trips to optimize this delay estimation such that the estimation is progressively more accurate for future trips. Breaker wear may be proportional to $I^2T$ or $I^3T$ depending on the technology. As mentioned above, the IEDs 120 may monitor this during the tripping of the breaker to estimate breaker life.

Nominal current is the current that a meter is specified to normally operate in. For example, a revenue meter may be specified with a nominal current of 5 amperes. The nominal current is an important specification to a revenue meter. To meet certain ANSI (American National Standards Institute) and IEC (International Engineering Consortium) standards, such as IEC 60687 1A 0.5S, EEC 60687 2A 0.5S, IEC 60687 5A 0.5S, ANSI C12.20 (1998) Class 10 0.5, and ANSI (1998) C12.20 Class 20 0.5, a meter should be able to measure a current as low as 10 mA or 0.1% of nominal current, whichever is lower. For example, a 5A nominal revenue meter should be able to register a current at 5 mA. The billing power monitoring functionality of the IEDs 120 may meet the standards for minimal current.

Digital output endurance is defined as the minimum number of digital output operations that a digital output is designed to withstand. Once the digital output endurance of a particular digital output is exceeded, the digital output may not operate to specification. For a relay operation, the digital outputs of the IED 120 may have a digital output endurance of at least 10,000 operations at specified voltage and current.

Make current on a digital output is the amount of current the digital output can withstand for a brief period of time. This higher amount of current usually flows in the digital output when an electrical connection is being made. The make current is typically the inrush current of the electrical device that is being energized by the digital output making the electrical connection. In the case of a protective relay, the typical make current specification is 30 Amperes for at least 200 milliseconds. Power quality devices and revenue meter devices may not have this high of a make current specification and typically could not withstand a current of this magnitude for that time frame. The IED 120 that is able to replace both a revenue meter and a protective relay may have at least one digital output that has a make current rated at least at 30 Amperes for at least 200 milliseconds.

The IED 120 may have a number of possible mounting methods. The IED 120 may be designed to fit into and comply with a revenue meter socket. Alternatively, the IED 120 may be designed to fit into a rack mount, such as a 19 inch rack. It should be understood that the rack mount design is not limited to a particular size of rack mount. In another alternative, the IED 120 may be designed to be mounted in the same manner as an ABASE revenue meter. Alternatively, the IED 120 may be designed to be mounted in the same manner as a switchboard meter. In still another alternative, the IED 120 may be designed for a DIN rail mount.

The benefit of an IED 120 that comprises functionality of a power meter and of a protective relay into a form traditionally only used by power meter devices, allows cost effective retro fit of existing systems without the additional expense of additional installation hardware. In addition, it sharply decreases any learning curve of an installer that is already versed in the installation of common revenue meter mounting and wiring methods. Further, these mounting methods may extend the ease of and standardization of installation, removal, and replacement of existing power meter devices and protective relay devices with the IED 120.

While the present invention has been described with reference to specific exemplary embodiments, it will be evident that various modifications and changes may be made without departing from the broader spirit and scope of the invention. It is therefore intended that the foregoing detailed description be regarded as illustrative rather than limiting. Accordingly, the specification and drawings are to be regarded in an illustrative rather than a restrictive sense.

We claim:

1. An intelligent electronic device for monitoring electrical parameters in an electrical circuit, the intelligent electronic device comprising:
    a sensor configured to be coupled with the electrical circuit and sense at least one of current and voltage in the electrical circuit, the sensor also configured to generate a signal indicative of the at least one of current and voltage;
    a processor coupled with the sensor, wherein the processor is configured to generate a measurement signal indicative of the at least one of current and voltage in response to the signal;
    the processor configured to concurrently provide a first intelligent electronic device functionality comprising a first security access and a second intelligent electronic device functionality comprising a second security access;
    wherein the first functionality and the second functionality comprise different categories of power system monitoring or control, and the first security access and the second security access are each configured to provide user access to at least one mutually exclusive function.

2. The intelligent electronic device of claim 1, wherein the first intelligent electronic device functionality and the second intelligent electronic device functionality each exclusively comprise at least one of a circuit breaker control functionality, a power quality functionality, a billing power monitoring functionality, a protective relay functionality, and a sequence of events recording functionality.

3. The intelligent electronic device of claim 1, wherein the first security access is enabled with a first user identification and the second security access is enabled with a second user identification.

4. The intelligent electronic device of claim 3, wherein at least one of the first user identification and the second user identification includes a permissive signal, the permissive signal indicative of when a predetermined condition is met.

5. The intelligent electronic device of claim 4, wherein the predetermined condition comprises enablement of a safety lockout mechanism.

6. The intelligent electronic device of claim 4, wherein the predetermined condition comprises the status of a digital input to the intelligent electronic device.

7. The intelligent electronic device of claim 4, wherein the predetermined condition comprises a determined time period.

8. The intelligent electronic device of claim 1, further comprising an interface coupled with the processor, wherein the processor is configured to provide an energy parameter to the interface as a function of the measurement signal.

9. The intelligent electronic device of claim 8, wherein the interface is configured to receive a first user identification to enable the first security access and a second user identification to enable the second security access.

10. The intelligent electronic device of claim 8, wherein the first intelligent electronic device functionality and the second intelligent electronic device functionality are configured to share the interface.

11. The intelligent electronic device of claim 8, wherein the interface comprises a biometric identification device coupled with the processor, wherein the biometric identification device is configured to identify a user as part of at least one of the first security access and the second security access.

12. The intelligent electronic device of claim 11, wherein the biometric identification device comprises a fingerprint scanner.

13. The intelligent electronic device of claim 11, wherein the biometric identification device comprises a face recognition unit.

14. The intelligent electronic device of claim 11, wherein the biometric identification device comprises a retinal scanner.

15. The intelligent electronic device of claim 1, wherein the processor comprises a first processor and a second processor, the first processor configured to provide the first intelligent electronic device functionality and the second processor configured to concurrently provide the second intelligent electronic device functionality.

16. The intelligent electronic device of claim 15, wherein the second processor is configured to function independent of the first processor.

17. The intelligent electronic device of claim 16, wherein the first intelligent electronic device functionality includes a billing power monitoring functionality and the second intelligent electronic device functionality includes a protective relay functionality.

18. The intelligent electronic device of claim 1, wherein the first intelligent electronic device functionality includes a protective relay functionality.

19. The intelligent electronic device of claim 1, wherein the first intelligent electronic device functionality includes a circuit breaker control functionality.

20. The intelligent electronic device of claim 1, wherein the first intelligent electronic device functionality includes a billing power monitoring functionality and the second intelligent electronic device functionality includes a protective relay functionality.

21. The intelligent electronic device of claim 1, wherein the first intelligent electronic device functionality includes a power quality functionality and the second intelligent electronic device functionality includes a protective relay functionality.

22. The intelligent electronic device of claim 1 further comprising:
a sensor interface coupled to the sensor, wherein the sensor interface is configured to couple to an external electrical sensor that is directly coupled to the electrical circuit.

23. A method of secure access to an intelligent electronic device, the method comprising:
providing an intelligent electronic device that includes a sensor interface configured to operably couple to a power system sensor, the intelligent electronic device configured to monitor an electrical parameter of an electrical circuit in a power system;
the intelligent electronic device prompting for entry of a user identification to access the functionalities of the intelligent electronic device;
allowing access to a first intelligent electronic device functionality provided by the intelligent electronic device only as a function of entry of a first user identification; and
allowing access to a second intelligent electronic device functionality provided by the intelligent electronic device only as a function of entry of a second user identification, wherein the first intelligent electronic device functionality and the second intelligent electronic device functionality both include independent functions that comprise different categories of power system monitoring or control.

24. The method of claim 23, wherein the intelligent electronic device is operating the first and second intelligent electronic device functionalities in parallel.

25. The method of claim 23, further comprising performing a plurality of intelligent electronic device functionalities concurrently within the intelligent electronic device, wherein the intelligent electronic device functionalities include at least two of a circuit breaker control functionality, a power quality functionality, a billing power monitoring functionality, a protective relay functionality and a sequence of events recording functionality.

26. The method of claim 23, wherein allowing access comprises receiving as one of the first user identification and the second user identification a security code and a permissive signal, wherein the permissive signal indicates that a predetermined condition has been met.

27. The method of claim 23, wherein allowing access comprises receiving as one of the first and second user identification a security code from a biometric identification device.

28. The method of claim 23, wherein allowing access comprises comparing the first user identification and the second user identification to a plurality of stored user identifications and enabling secure access to the respective first and second intelligent electronic device functionalities as a function of a match.

29. The method of claim 23, wherein the intelligent electronic device prompting for entry of the user identification is in response to a request to access one of the first and second intelligent electronic device functionalities.

30. The method of claim 23, wherein the intelligent electronic device prompting for entry of the user identification comprises communication of a plurality of stored user identifications over a communication medium to the processor, the processor configured to compare the stored user identifications to the first and second user identification.

31. The method of claim 23, wherein the power system sensor is internal to the intelligent electronic device.

32. An intelligent electronic device configured to monitor electrical parameters in an electrical circuit, the intelligent electronic device comprising:
a processor operable in the intelligent electronic device to send and receive electrical signals that include electrical signals indicative of electrical parameters in the electrical circuit;
a sensor interface coupled to the processor and positioned proximate to the processor, the sensor interface configured to operably couple with a sensor coupled with the electrical circuit, and the processor configured to at least one of monitor, meter, measure, and control the electrical circuit;
a memory device coupled with the processor, wherein the memory device is configured to store parameters related to the electrical signals indicative of electrical parameters in the electrical circuit;
wherein the processor is configurable to allow access to a first data parameter stored in the memory device as a function of a first security signal, wherein the first data parameter is included in a first intelligent electronic device functionality;
wherein the processor is configurable to allow access to a second data parameter stored in the memory device as a function of a second security signal, wherein the second data parameter is included in a second intelligent electronic device functionality; and wherein the first intelligent electronic device functionality and the second intelligent electronic device functionality both include independent functions that comprise different categories of power system monitoring or control.

33. The intelligent electronic device of claim 32, wherein the first and second security signals comprises a respective first and second user identification.

34. The intelligent electronic device of claim 32, wherein the processor is configured to operate the first and second intelligent electronic device functionalities concurrently.

35. The intelligent electronic device of claim 32, wherein one of the first and second security signals comprises a security code and a permissive signal.

36. The intelligent electronic device of claim 32, further comprising a biometric identification device, wherein at least part of the security code is generated by the biometric identification device.

37. The intelligent electronic device of claim 32, wherein at least one of the first and second security signals are transmitted over a communication medium.

38. The intelligent electronic device of claim 32, further comprising a communication link coupled with the processor, wherein the processor is configured to request a plurality of stored security signals be communicated over the communication link to compare with the first and second security signals.

39. An intelligent electronic device configured to monitor electrical parameters in an electrical circuit, the intelligent electronic device comprising:
   a memory device configured to store instructions;
   instructions in the memory device to process and store data indicative of electrical parameters sensed on the electrical circuit;
   instructions in the memory device to concurrently perform billing power monitoring functionality and protective relay functionality as a function of the sensed electrical parameters;
   instructions in the memory device to configure the intelligent electronic device to allow access to the billing power monitoring functionality only when a first user identification is provided; and
   instructions in the memory device to configure the intelligent electronic device to allow access to the protective relaying functionality only when a second user identification is provided.

40. The intelligent electronic device of claim 39, further comprising instructions in the memory device to enable access to one of the billing power monitoring functionality and the protective relay functionality with the same interface.

41. The intelligent electronic device of claim 39, further comprising instructions in the memory device to concurrently perform at least one of a circuit breaker control functionality, a power quality functionality and a sequence of events recording functionality.

42. The intelligent electronic device of claim 39, wherein the processor comprises a microprocessor and a digital signal processor in cooperative operation.

43. The intelligent electronic device of claim 39, further comprising instructions in the memory device to verify a determined condition has been met prior to providing access, wherein the determined condition comprises at least one of enablement of a safety lockout mechanism, transition of a digital input and a determined time period.

44. A method of securing access to an intelligent electronic device via a graphical user interface that includes a display and a selection device, the method comprising:
   retrieving from a memory of the intelligent electric device a security access entry for presentation on the display of the intelligent electronic device, the intelligent electronic device configured to operably couple to an electrical circuit;
   displaying the security access entry on the display of the intelligent electronic device;
   receiving one of a plurality of security signals entered as a function of the selection device into the security access entry;
   in response to a first security signal, allowing access to a first intelligent electronic device functionality available within the intelligent electronic device; and
   in response to a second security signal, allowing access to a second intelligent electronic device functionality available within the intelligent electronic device, wherein each of the first and second electronic device functionalities are representative of different categories of power system monitoring or control and each includes a mutually exclusive function.

45. The method of claim 42 further comprising:
   receiving from a remote location a security access query; and
   the intelligent electronic device providing information to generate a remote display of the security access entry at the remote location.

* * * * *